(12) United States Patent  (10) Patent No.: US 7,684,965 B2
Sekine et al.  (45) Date of Patent: Mar. 23, 2010

(54) METHOD AND APPARATUS FOR PROCESSING DATA, AND COMPUTER PRODUCT

(75) Inventors: Hiroaki Sekine, Kawasaki (JP);
Hidetaka Tsuda, Kawasaki (JP);
Hidehiro Shirai, Kawasaki (JP)

(73) Assignee: Fujitsu Microelectronics Limited, Yokohama (JP)

( * ) Notice: Subject to any disclaimer, the term of this patent is extended or adjusted under 35 U.S.C. 154(b) by 640 days.

(21) Appl. No.: 11/602,236

(22) Filed: Nov. 21, 2006

(65) Prior Publication Data

US 2007/0288105 A1 Dec. 13, 2007

(30) Foreign Application Priority Data

Jun. 9, 2006 (JP) .............................. 2006-161456

(51) Int. Cl.
*G06F 17/10* (2006.01)
(52) U.S. Cl. ....................................................... 703/2
(58) Field of Classification Search ...................... 703/2; 381/59; 435/5, 6; 700/121; 705/35, 4; 707/3; 702/120
See application file for complete search history.

(56) References Cited

U.S. PATENT DOCUMENTS

| 2005/0159896 | A1* | 7/2005 | Ishikawa et al. ............... 702/19 |
| 2005/0195982 | A1* | 9/2005 | Olive ............................ 381/59 |
| 2006/0080059 | A1* | 4/2006 | Stupp et al. ................. 702/120 |
| 2006/0095411 | A1* | 5/2006 | Baba et al. ..................... 707/3 |
| 2006/0136273 | A1* | 6/2006 | Zizzamia et al. ................ 705/4 |
| 2006/0200395 | A1* | 9/2006 | Masuyama et al. ............ 705/35 |
| 2006/0205003 | A1* | 9/2006 | Gustafsson et al. ............. 435/6 |

(Continued)

FOREIGN PATENT DOCUMENTS

JP 2001-306999 11/2001

(Continued)

OTHER PUBLICATIONS

J.A. Power, et al.; "Relating Statistical MOSFET Model Parameter Variabilities to IC Manufacturing Process Fluctuations Enabling Realistic Worst Case Design;" *IEEE Transactions on Semiconductor Manufacturing*; vol. 7; No. 3; Aug. 1994; pp. 306-318 (7 Sheets total.).

(Continued)

*Primary Examiner*—Paul L Rodriguez
*Assistant Examiner*—Kandasamy Thangavelu
(74) *Attorney, Agent, or Firm*—Krantz, Quintos & Hanson, LLP

(57) ABSTRACT

Abnormal values of an objective variable are removed. A degree of association between an objective variable and a plurality of explanatory variables is calculated. A plurality of explanatory variables having a high degree of association are extracted. A degree of independence between the explanatory variables is calculated. A plurality of candidates of explanatory variables with a high possibility of having a great effect on the objective variable are selected based on the degree of association and the degree of independence. An explanatory variable having a high rate of contribution to the objective variable is selected from among the candidates, based on the cumulative contribution rate, and a regression equation is calculated to estimate a value of the objective variable. The same processing is repeated, using the difference as a new objective variable and explanatory variables except the explanatory variable used to obtain the difference as new explanatory variables.

14 Claims, 34 Drawing Sheets

U.S. PATENT DOCUMENTS

2006/0212156 A1* 9/2006 Tanaka et al. ............... 700/121
2007/0020615 A1* 1/2007 Van Marck et al. ............ 435/5
2008/0199853 A1* 8/2008 Wohlgemuth et al. .......... 435/6

FOREIGN PATENT DOCUMENTS

| JP | 2002-324206 | 11/2002 |
|---|---|---|
| JP | 2003-142361 | 5/2003 |
| JP | 2004-349419 | 12/2004 |

OTHER PUBLICATIONS

T. Yasuda, et al.; "A Determination Technique of Worst Case MOSFET Model Parameter Using Multivariate Analysis;" *The Institute of Electronics, Information and Communication Engineers*; Nov. 1996; pp. 27-33 and cover page (8 Sheets total./Yes-Abstract.

N. Shigyo, et al.; "TCAD Based Statistical Analysis of MOSFET's;" *The Institute of Electronics, Information and Communication Engineers*; Sep. 1997; pp. 63-70 and cover page (9 Sheets total.)/Yes-Abstract.

* cited by examiner

FIG.15

| RECORD NO. | SUPPLE-MENTARY INFORMATION | | | CIRCUIT CHARACTERISTIC DATA | | | RESISTOR MODEL | | | | |
|---|---|---|---|---|---|---|---|---|---|---|---|
| | WF NO. | X | Y | POWER SOURCE CURRENT | GAIN | NOISE FACTOR | RESISTOR PARAMETER 1 | RESISTOR PARAMETER 2 | RESISTOR PARAMETER 3 | ... | RESISTOR PARAMETER 11 |
| 1 | 1 | 4 | 1 | 1.02E-03 | 5.78 | 1083 | 4.76E-09 | 3439 | 2701 | ... | 2.46E-17 |
| 2 | 1 | 6 | 2 | 1.01E-03 | 8.50 | 9.99 | 6.09E-09 | 3643 | 2813 | ... | 1.92E-17 |
| 3 | 1 | 5 | 2 | 1.02E-03 | 7.01 | 10.16 | 6.23E-09 | 3596 | 2732 | ... | 1.80E-17 |
| 4 | 1 | 4 | 2 | 1.01E-03 | 6.67 | 10.69 | 5.39E-09 | 3569 | 2887 | ... | 1.14E-17 |
| 5 | 1 | 3 | 2 | 1.01E-03 | 6.50 | 10.53 | 5.88E-09 | 3604 | 2852 | ... | 1.10E-17 |
| 6 | 1 | 2 | 2 | 9.95E-04 | 6.01 | 10.37 | 6.18E-09 | 3706 | 2876 | ... | 1.72E-17 |
| 7 | 1 | 1 | 3 | 1.01E-03 | 5.91 | 10.70 | 6.02E-09 | 3618 | 2777 | ... | 1.94E-17 |
| ⋮ | ⋮ | ⋮ | ⋮ | ⋮ | ⋮ | ⋮ | ⋮ | ⋮ | ⋮ | ⋮ | ⋮ |
| 551 | 12 | 3 | 8 | 1.04E-03 | 5.70 | 10.64 | 6.05E-09 | 3633 | 2929 | ... | 1.68E-17 |
| 552 | 12 | 2 | 8 | 1.01E-03 | 5.65 | 10.55 | 6.07E-09 | 3629 | 2984 | ... | 1.20E-17 |

FIG.16

| RECORD NO | CAPACITANCE MODEL ||||| TRANSISTOR MODEL |||||
|---|---|---|---|---|---|---|---|---|---|---|
| | CAPACITANCE PARAMETER 1 | CAPACITANCE PARAMETER 2 | CAPACITANCE PARAMETER 3 | ... | CAPACITANCE PARAMETER 6 | TRANSISTOR PARAMETER 1 | TRANSISTOR PARAMETER 2 | TRANSISTOR PARAMETER 3 | ... | TRANSISTOR PARAMETER 44 |
| 1 | 2.39 | 2409 | 2.10E-11 | ... | 4.48E-15 | 0.83 | 0.473 | 25.4 | ... | 0.103 |
| 2 | 1.82 | 3228 | 2.36E-11 | ... | 3.19E-15 | 1.15 | 0.635 | 24.5 | ... | 0.104 |
| 3 | 1.72 | 4225 | 2.42E-11 | ... | 2.74E-15 | 1.12 | 0.635 | 24.3 | ... | 0.302 |
| 4 | 1.50 | 4152 | 2.41E-11 | ... | 2.92E-15 | 1.12 | 0.635 | 24.3 | ... | 0.177 |
| 5 | 1.99 | 4248 | 2.37E-11 | ... | 2.94E-15 | 1.15 | 0.650 | 24.7 | ... | 0.083 |
| 6 | 1.82 | 4543 | 2.42E-11 | ... | 3.17E-15 | 0.88 | 0.502 | 25.2 | ... | 0.054 |
| 7 | 2.18 | 4203 | 2.52E-11 | ... | 3.02E-15 | 1.01 | 0.576 | 25.2 | ... | 0.103 |
| ⋮ | ⋮ | ⋮ | ⋮ | ⋮ | ⋮ | ⋮ | ⋮ | ⋮ | | ⋮ |
| 551 | 1.25 | 3489 | 2.36E-11 | ... | 3.38E-15 | 1.06 | 0.607 | 24.2 | ... | 0.082 |
| 552 | 2.47 | 5085 | 2.96E-11 | ... | 3.93E-16 | 1.14 | 0.649 | 24.4 | ... | 0.148 |

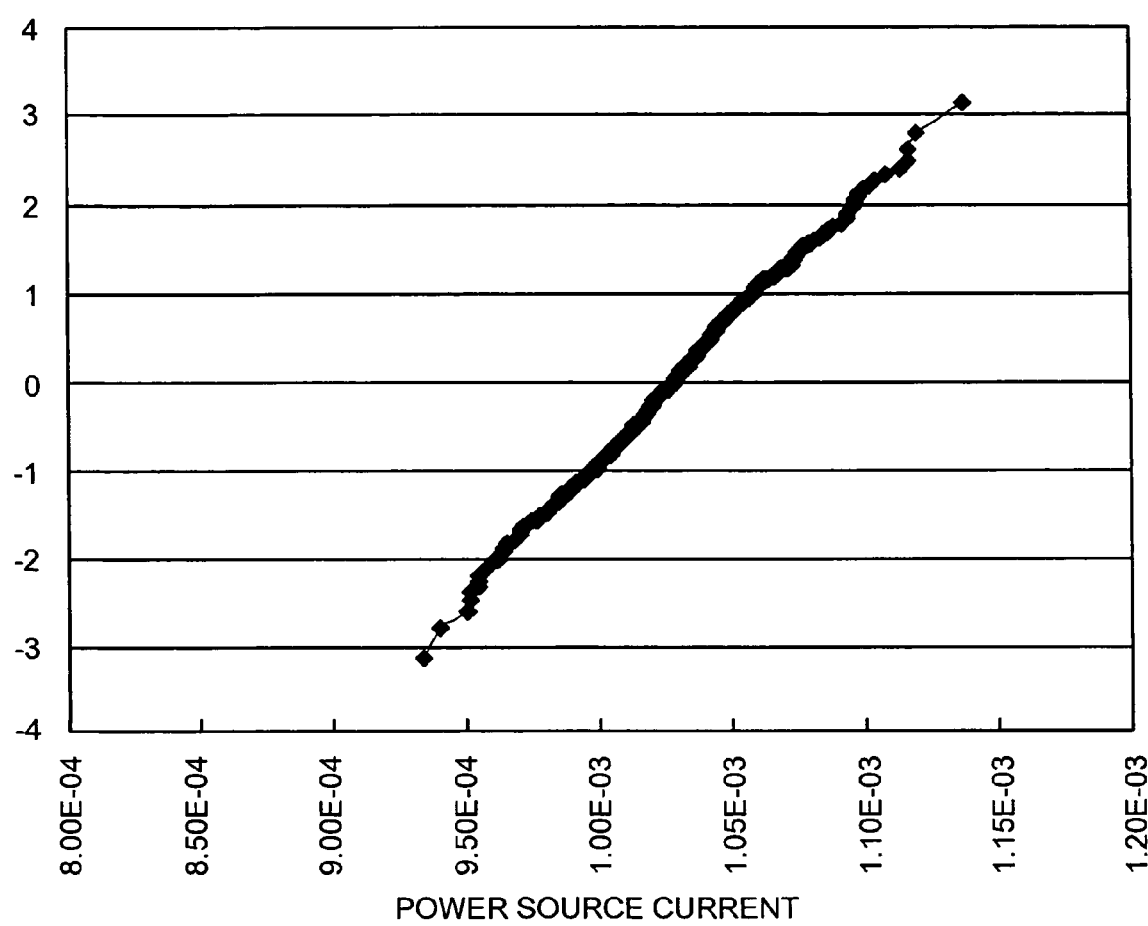

FIG.20

| EXPLANATORY VARIABLE | THRESHOLD | SQUARE SUM | LOW-N | HIGH-N |
| --- | --- | --- | --- | --- |
| TRANSISTOR PARAMETER 11 | =<275 | 20.43483 | 342 | 208 |
| TRANSISTOR PARAMETER 19 | >1.62 | 18.99897 | 357 | 193 |
| TRANSISTOR PARAMETER 17 | =<19.4 | 17.34882 | 373 | 177 |
| TRANSISTOR PARAMETER 10 | =<1.7E-18 | 14.91918 | 320 | 230 |
| RESISTOR PARAMETER 9 | =<3.87E-15 | 14.7361 | 354 | 196 |
| RESISTOR PARAMETER 8 | =<5.17E-15 | 14.54428 | 348 | 202 |
| TRANSISTOR PARAMETER 8 | =<1.34E+03 | 14.10087 | 344 | 206 |
| TRANSISTOR PARAMETER 33 | =<0.00317 | 13.78952 | 309 | 241 |
| TRANSISTOR PARAMETER 20 | >0.000362 | 13.57374 | 388 | 162 |
| TRANSISTOR PARAMETER 23 | =<4.31E+01 | 13.32896 | 366 | 184 |
| TRANSISTOR PARAMETER 21 | =<6.95E-17 | 12.67895 | 450 | 100 |
| TRANSISTOR PARAMETER 13 | =<2.57E+01 | 12.43301 | 377 | 173 |
| TRANSISTOR PARAMETER 22 | =<2.08E+00 | 11.55224 | 291 | 259 |
| TRANSISTOR PARAMETER 3 | =<24.1 | 11.38467 | 386 | 164 |
| TRANSISTOR PARAMETER 35 | =<1.01E-15 | 11.04995 | 113 | 437 |
| TRANSISTOR PARAMETER 4 | =<19.4 | 11.04273 | 50 | 500 |
| TRANSISTOR PARAMETER 34 | =<63.1 | 10.71923 | 376 | 174 |
| TRANSISTOR PARAMETER 2 | =<0.576 | 10.45896 | 52 | 498 |
| TRANSISTOR PARAMETER 1 | =<9.90E-01 | 10.23677 | 41 | 509 |
| TRANSISTOR PARAMETER 9 | =<1.6E-14 | 10.0653 | 426 | 124 |

FIG.21

| TRANSISTOR PARAMETER 11 | TRANSISTOR PARAMETER 19 |
|---|---|
| 5.08E+01 | 5.12E+01 |
| 1.46E+02 | 3.00E+00 |
| 1.56E+02 | 2.77E+00 |
| 1.60E+02 | 2.93E+00 |
| 1.41E+02 | 3.82E+00 |
| 9.14E+01 | 1.23E+01 |
| 6.60E+01 | 5.12E+01 |
| 1.58E+02 | 2.72E+00 |
| 1.63E+02 | 2.75E+00 |
| 1.72E+02 | 2.50E+00 |
| 1.80E+02 | 2.43E+00 |
| 1.73E+02 | 2.57E+00 |
| ....... | |
| 3.16E+02 | 1.59E+00 |
| 2.57E+02 | 1.81E+00 |
| 1.76E+02 | 2.48E+00 |

FIG.22

|  | TRAN-SIS-TOR PA-RAM-ETER 11 | TRAN-SIS-TOR PA-RAM-ETER 19 | TRAN-SIS-TOR PA-RAM-ETER 17 | TRAN-SIS-TOR PA-RAM-ETER 10 | RE-SIS-TOR PA-RAM-ETER 10 | RE-SIS-TOR PA-RAM-ETER 9 | TRAN-SIS-TOR PA-RAM-ETER 8 | TRAN-SIS-TOR PA-RAM-ETER 33 | TRAN-SIS-TOR PA-RAM-ETER 20 | TRAN-SIS-TOR PA-RAM-ETER 23 |
|---|---|---|---|---|---|---|---|---|---|---|
| TRANSISTOR PARAMETER 11 | 1.000 | 0.925 | 0.836 | 0.810 | 0.444 | 0.440 | 0.706 | 0.665 | 0.756 | 0.612 |
| TRANSISTOR PARAMETER 19 | 0.925 | 1.000 | 0.894 | 0.789 | 0.415 | 0.404 | 0.721 | 0.680 | 0.771 | 0.584 |
| TRANSISTOR PARAMETER 17 | 0.836 | 0.894 | 1.000 | 0.684 | 0.387 | 0.392 | 0.668 | 0.645 | 0.817 | 0.551 |
| TRANSISTOR PARAMETER 10 | 0.810 | 0.789 | 0.684 | 1.000 | 0.310 | 0.306 | 0.666 | 0.543 | 0.659 | 0.456 |
| RESISTOR PARAMETER 9 | 0.444 | 0.415 | 0.387 | 0.310 | 1.000 | 0.976 | 0.302 | 0.336 | 0.313 | 0.341 |
| RESISTOR PARAMETER 8 | 0.440 | 0.404 | 0.392 | 0.306 | 0.976 | 1.000 | 0.291 | 0.346 | 0.310 | 0.329 |
| TRANSISTOR PARAMETER 8 | 0.706 | 0.721 | 0.668 | 0.666 | 0.302 | 0.291 | 1.000 | 0.612 | 0.559 | 0.476 |
| TRANSISTOR PARAMETER 33 | 0.665 | 0.680 | 0.645 | 0.543 | 0.336 | 0.346 | 0.612 | 1.000 | 0.487 | 0.482 |
| TRANSISTOR PARAMETER 20 | 0.756 | 0.771 | 0.817 | 0.659 | 0.313 | 0.310 | 0.559 | 0.487 | 1.000 | 0.494 |
| TRANSISTOR PARAMETER 23 | 0.612 | 0.584 | 0.551 | 0.458 | 0.341 | 0.329 | 0.476 | 0.482 | 0.494 | 1.000 |
| TRANSISTOR PARAMETER 21 | 0.414 | 0.391 | 0.368 | 0.359 | 0.270 | 0.261 | 0.276 | 0.214 | 0.359 | 0.222 |
| TRANSISTOR PARAMETER 13 | 0.594 | 0.648 | 0.656 | 0.518 | 0.197 | 0.187 | 0.626 | 0.566 | 0.644 | 0.448 |
| TRANSISTOR PARAMETER 22 | 0.557 | 0.497 | 0.422 | 0.591 | 0.359 | 0.354 | 0.363 | 0.384 | 0.457 | 0.361 |
| TRANSISTOR PARAMETER 3 | 0.521 | 0.515 | 0.469 | 0.446 | 0.414 | 0.410 | 0.381 | 0.347 | 0.398 | 0.454 |
| TRANSISTOR PARAMETER 35 | 0.029 | -0.010 | -0.003 | -0.009 | 0.044 | 0.055 | -0.029 | 0.085 | -0.111 | -0.024 |
| TRANSISTOR PARAMETER 4 | -0.213 | -0.229 | -0.241 | -0.254 | -0.205 | -0.197 | -0.218 | -0.104 | -0.358 | -0.260 |
| TRANSISTOR PARAMETER 34 | 0.663 | 0.661 | 0.644 | 0.640 | 0.267 | 0.256 | 0.510 | 0.416 | 0.700 | 0.412 |
| TRANSISTOR PARAMETER 2 | -0.218 | -0.234 | -0.239 | -0.259 | -0.202 | -0.194 | -0.233 | -0.101 | -0.356 | -0.258 |
| TRANSISTOR PARAMETER 1 | -0.262 | -0.276 | -0.286 | -0.307 | -0.252 | -0.245 | -0.267 | -0.157 | -0.402 | -0.307 |
| TRANSISTOR PARAMETER 9 | 0.431 | 0.419 | 0.410 | 0.409 | 0.198 | 0.198 | 0.316 | 0.250 | 0.338 | 0.333 |

FIG.23

|  | TRANSISTOR PARAMETER 21 | TRANSISTOR PARAMETER 13 | TRANSISTOR PARAMETER 22 | TRANSISTOR PARAMETER 3 | TRANSISTOR PARAMETER 35 | TRANSISTOR PARAMETER 4 | TRANSISTOR PARAMETER 34 | TRANSISTOR PARAMETER 2 | TRANSISTOR PARAMETER 1 | TRANSISTOR PARAMETER 9 |
|---|---|---|---|---|---|---|---|---|---|---|
| TRANSISTOR PARAMETER 11 | 0.414 | 0.594 | 0.557 | 0.521 | 0.029 | -0.213 | 0.663 | -0.218 | -0.262 | 0.431 |
| TRANSISTOR PARAMETER 19 | 0.391 | 0.648 | 0.497 | 0.515 | -0.010 | -0.229 | 0.661 | -0.234 | -0.276 | 0.419 |
| TRANSISTOR PARAMETER 17 | 0.368 | 0.656 | 0.422 | 0.469 | -0.003 | -0.241 | 0.644 | -0.239 | -0.286 | 0.410 |
| TRANSISTOR PARAMETER 10 | 0.359 | 0.518 | 0.591 | 0.446 | -0.009 | -0.254 | 0.640 | -0.259 | -0.307 | 0.409 |
| RESISTOR PARAMETER 9 | 0.270 | 0.197 | 0.359 | 0.414 | 0.044 | -0.205 | 0.267 | -0.202 | -0.252 | 0.198 |
| RESISTOR PARAMETER 8 | 0.261 | 0.187 | 0.354 | 0.410 | 0.055 | -0.197 | 0.256 | -0.194 | -0.245 | 0.198 |
| TRANSISTOR PARAMETER 8 | 0.276 | 0.626 | 0.363 | 0.381 | -0.029 | -0.218 | 0.510 | -0.223 | -0.267 | 0.316 |
| TRANSISTOR PARAMETER 33 | 0.214 | 0.566 | 0.384 | 0.347 | 0.085 | -0.104 | 0.416 | -0.101 | -0.157 | 0.250 |
| TRANSISTOR PARAMETER 20 | 0.359 | 0.644 | 0.457 | 0.398 | -0.111 | -0.358 | 0.700 | -0.356 | -0.402 | 0.338 |
| TRANSISTOR PARAMETER 23 | 0.222 | 0.448 | 0.361 | 0.454 | -0.024 | -0.260 | 0.412 | -0.258 | -0.307 | 0.333 |
| TRANSISTOR PARAMETER 21 | 1.000 | 0.167 | 0.318 | 0.492 | -0.284 | -0.511 | 0.252 | -0.510 | -0.549 | 0.339 |
| TRANSISTOR PARAMETER 13 | 0.167 | 1.000 | 0.177 | 0.200 | -0.170 | -0.321 | 0.482 | -0.318 | -0.366 | 0.257 |
| TRANSISTOR PARAMETER 22 | 0.318 | 0.177 | 1.000 | 0.474 | 0.132 | -0.152 | 0.478 | -0.157 | -0.208 | 0.347 |
| TRANSISTOR PARAMETER 3 | 0.492 | 0.200 | 0.474 | 1.000 | -0.060 | -0.322 | 0.359 | -0.320 | -0.367 | 0.257 |
| TRANSISTOR PARAMETER 35 | -0.284 | -0.170 | 0.132 | -0.060 | 1.000 | 0.546 | -0.116 | 0.551 | 0.456 | -0.211 |
| TRANSISTOR PARAMETER 4 | -0.511 | -0.321 | -0.152 | -0.322 | 0.546 | 1.000 | -0.356 | 0.914 | 0.892 | -0.392 |
| TRANSISTOR PARAMETER 34 | 0.252 | 0.482 | 0.478 | 0.359 | -0.116 | -0.356 | 1.000 | -0.354 | -0.402 | 0.466 |
| TRANSISTOR PARAMETER 2 | -0.510 | -0.318 | -0.157 | -0.320 | 0.551 | 0.914 | -0.354 | 1.000 | 0.871 | -0.399 |
| TRANSISTOR PARAMETER 1 | -0.549 | -0.366 | -0.208 | -0.367 | 0.456 | 0.892 | -0.402 | 0.871 | 1.000 | -0.433 |
| TRANSISTOR PARAMETER 9 | 0.339 | 0.257 | 0.347 | 0.257 | -0.211 | -0.392 | 0.466 | -0.399 | -0.433 | 1.000 |

TRANSISTOR PARAMETER 11

RESISTOR PARAMETER 9

FIG.36

| EXPLANATORY VARIABLE | THRESHOLD | SQUARE SUM | LOW-N | HIGH-N |
|---|---|---|---|---|
| RESISTOR PARAMETER 2 | =< 3612.939063 | 11.02262102 | 127 | 402 |
| CAPACITANCE PARAMETER 5 | > 2.14764 E-14 | 9.694212693 | 301 | 228 |
| TRANSISTOR PARAMETER 8 | =< 1041.668024 | 9.001519357 | 126 | 403 |
| TRANSISTOR PARAMETER 14 | =< 0.011846714 | 7.945812954 | 216 | 313 |
| TRANSISTOR PARAMETER 5 | =< 1.11788 E-11 | 7.349068139 | 211 | 318 |
| RESISTOR PARAMETER 1 | =< 6.11787 E-09 | 7.040534491 | 368 | 161 |
| TRANSISTOR PARAMETER 44 | > 0.178416714 | 6.451475429 | 117 | 412 |
| TRANSISTOR PARAMETER 43 | > 0.001975695 | 6.431183931 | 63 | 466 |
| TRANSISTOR PARAMETER 39 | > 1.91629 E-20 | 6.411921096 | 332 | 197 |
| TRANSISTOR PARAMETER 25 | > 41.33120187 | 6.347840496 | 94 | 435 |
| TRANSISTOR PARAMETER 26 | > 388.0618016 | 6.237852462 | 458 | 71 |
| TRANSISTOR PARAMETER 9 | =< 1.34203 E-14 | 6.029276496 | 295 | 234 |
| RESISTOR PARAMETER 11 | =< 1.35785 E-17 | 5.993159928 | 322 | 207 |
| RESISTOR PARAMETER 10 | =< 8.11814 E-16 | 5.993159928 | 322 | 207 |
| RESISTOR PARAMETER 3 | =< 2877.256782 | 5.913960362 | 63 | 466 |
| TRANSISTOR PARAMETER 32 | > 4.497796416 | 5.785053243 | 57 | 472 |
| TRANSISTOR PARAMETER 33 | =< 0.001908424 | 5.727329893 | 158 | 371 |
| TRANSISTOR PARAMETER 23 | =< 31.37522812 | 5.636200616 | 88 | 441 |
| TRANSISTOR PARAMETER 10 | =< 1.35096 E-18 | 5.544964804 | 222 | 307 |
| TRANSISTOR PARAMETER 4 | > 18.02731703 | 5.393524987 | 519 | 10 |

FIG.37

|  | RESISTOR PARAMETER 2 | RESISTOR PARAMETER 5 | TRANSISTOR PARAMETER 8 | TRANSISTOR PARAMETER 14 | RESISTOR PARAMETER 5 | RESISTOR PARAMETER 1 | TRANSISTOR PARAMETER 44 | TRANSISTOR PARAMETER 43 | TRANSISTOR PARAMETER 39 | TRANSISTOR PARAMETER 25 |
|---|---|---|---|---|---|---|---|---|---|---|
| RESISTOR PARAMETER 2 | 1.000 | -0.091 | 0.673 | 0.392 | 0.330 | -0.021 | 0.244 | 0.205 | 0.065 | 0.491 |
| CAPACITANCE PARAMETER 5 | -0.091 | 1.000 | -0.072 | 0.043 | 0.084 | 0.158 | -0.028 | -0.164 | 0.060 | -0.127 |
| TRANSISTOR PARAMETER 8 | 0.673 | -0.072 | 1.000 | 0.482 | 0.508 | -0.010 | 0.311 | 0.130 | 0.207 | 0.598 |
| TRANSISTOR PARAMETER 14 | 0.392 | 0.043 | 0.482 | 1.000 | 0.470 | 0.075 | 0.067 | -0.056 | 0.190 | 0.215 |
| TRANSISTOR PARAMETER 5 | 0.330 | 0.084 | 0.508 | 0.470 | 1.000 | 0.081 | 0.143 | -0.044 | 0.368 | 0.249 |
| RESISTOR PARAMETER 1 | -0.021 | 0.158 | -0.010 | 0.075 | 0.081 | 1.000 | -0.115 | -0.272 | 0.130 | -0.122 |
| TRANSISTOR PARAMETER 44 | 0.244 | -0.028 | 0.311 | 0.067 | 0.143 | -0.115 | 1.000 | 0.531 | -0.056 | 0.153 |
| TRANSISTOR PARAMETER 43 | 0.205 | -0.164 | 0.130 | 0.056 | -0.044 | 0.272 | 0.531 | 1.000 | -0.232 | 0.050 |
| TRANSISTOR PARAMETER 39 | 0.065 | 0.060 | 0.207 | 0.190 | 0.368 | 0.130 | -0.056 | -0.232 | 1.000 | 0.002 |
| TRANSISTOR PARAMETER 25 | 0.491 | -0.127 | 0.598 | 0.215 | 0.249 | -0.122 | 0.153 | 0.050 | 0.002 | 1.000 |
| TRANSISTOR PARAMETER 26 | -0.266 | -0.040 | -0.269 | -0.063 | -0.134 | -0.095 | -0.299 | -0.494 | -0.069 | -0.379 |
| TRANSISTOR PARAMETER 9 | 0.235 | 0.086 | 0.310 | 0.285 | 0.235 | 0.236 | 0.094 | -0.115 | 0.119 | 0.167 |
| RESISTOR PARAMETER 11 | -0.095 | 0.114 | -0.084 | -0.036 | 0.096 | -0.050 | -0.203 | -0.229 | 0.103 | -0.252 |
| RESISTOR PARAMETER 10 | -0.095 | 0.114 | -0.084 | -0.036 | 0.096 | -0.050 | -0.203 | -0.229 | 0.103 | -0.252 |
| RESISTOR PARAMETER 3 | 0.423 | -0.231 | 0.336 | 0.051 | 0.054 | -0.304 | 0.130 | 0.189 | -0.168 | 0.349 |
| TRANSISTOR PARAMETER 32 | 0.276 | -0.165 | 0.187 | -0.002 | 0.001 | -0.294 | 0.120 | 0.229 | -0.248 | 0.143 |
| TRANSISTOR PARAMETER 33 | 0.582 | -0.074 | 0.730 | 0.380 | 0.405 | 0.047 | 0.297 | 0.125 | 0.202 | 0.635 |
| TRANSISTOR PARAMETER 23 | 0.609 | -0.305 | 0.543 | 0.225 | 0.156 | -0.195 | 0.171 | 0.158 | -0.034 | 0.522 |
| TRANSISTOR PARAMETER 10 | 0.431 | 0.006 | 0.589 | 0.431 | 0.363 | 0.203 | 0.223 | 0.073 | 0.197 | 0.422 |
| TRANSISTOR PARAMETER 4 | -0.558 | -0.204 | -0.561 | -0.377 | -0.361 | -0.053 | -0.585 | -0.741 | -0.159 | -0.672 |

FIG.38

|  | TRANSISTOR PARAMETER 26 | TRANSISTOR PARAMETER 9 | RESISTOR PARAMETER 11 | RESISTOR PARAMETER 10 | RESISTOR PARAMETER 3 | TRANSISTOR PARAMETER 32 | TRANSISTOR PARAMETER 33 | TRANSISTOR PARAMETER 23 | TRANSISTOR PARAMETER 10 | TRANSISTOR PARAMETER 4 |
|---|---|---|---|---|---|---|---|---|---|---|
| RESISTOR PARAMETER 2 | -0.266 | 0.235 | -0.095 | -0.095 | 0.423 | 0.276 | 0.582 | 0.609 | 0.431 | -0.558 |
| CAPACITANCE PARAMETER 5 | -0.040 | 0.086 | 0.114 | 0.114 | -0.231 | -0.165 | -0.074 | -0.305 | 0.006 | -0.204 |
| TRANSISTOR PARAMETER 8 | -0.269 | 0.310 | -0.084 | -0.084 | 0.336 | 0.187 | 0.730 | 0.543 | 0.589 | -0.561 |
| TRANSISTOR PARAMETER 14 | -0.063 | 0.285 | -0.036 | -0.036 | 0.051 | -0.002 | 0.380 | 0.225 | 0.431 | -0.377 |
| TRANSISTOR PARAMETER 5 | -0.134 | 0.235 | 0.096 | 0.096 | 0.054 | 0.001 | 0.405 | 0.156 | 0.363 | -0.361 |
| RESISTOR PARAMETER 1 | 0.095 | 0.236 | -0.050 | -0.050 | -0.304 | -0.294 | 0.047 | -0.195 | 0.203 | -0.053 |
| TRANSISTOR PARAMETER 44 | -0.299 | 0.094 | -0.203 | -0.203 | 0.130 | 0.120 | 0.297 | 0.171 | 0.223 | -0.585 |
| TRANSISTOR PARAMETER 43 | -0.494 | -0.115 | -0.229 | -0.229 | 0.189 | 0.229 | 0.125 | 0.158 | 0.073 | -0.741 |
| TRANSISTOR PARAMETER 39 | -0.069 | 0.119 | 0.103 | 0.103 | -0.168 | -0.248 | 0.202 | -0.034 | 0.197 | -0.159 |
| TRANSISTOR PARAMETER 25 | -0.379 | 0.167 | -0.252 | -0.252 | 0.349 | 0.143 | 0.635 | 0.522 | 0.422 | -0.672 |
| TRANSISTOR PARAMETER 26 | 1.000 | 0.074 | -0.103 | -0.103 | -0.494 | -0.517 | -0.166 | -0.400 | 0.029 | -0.083 |
| TRANSISTOR PARAMETER 9 | 0.074 | 1.000 | -0.085 | -0.085 | -0.072 | -0.158 | 0.456 | 0.087 | 0.626 | -0.300 |
| RESISTOR PARAMETER 11 | -0.103 | -0.085 | 1.000 | 1.000 | -0.392 | -0.270 | -0.121 | -0.171 | -0.105 | -0.188 |
| RESISTOR PARAMETER 10 | -0.103 | -0.085 | 1.000 | 1.000 | -0.392 | -0.270 | -0.121 | -0.171 | -0.105 | -0.188 |
| RESISTOR PARAMETER 3 | -0.494 | -0.072 | -0.392 | -0.392 | 1.000 | 0.248 | 0.308 | 0.374 | 0.150 | -0.757 |
| TRANSISTOR PARAMETER 32 | -0.517 | -0.158 | -0.270 | -0.270 | 0.248 | 1.000 | 0.200 | 0.209 | 0.080 | -0.783 |
| TRANSISTOR PARAMETER 33 | -0.166 | 0.456 | -0.121 | -0.121 | 0.308 | 0.200 | 1.000 | 0.534 | 0.737 | -0.530 |
| TRANSISTOR PARAMETER 23 | -0.400 | 0.087 | -0.171 | -0.171 | 0.374 | 0.209 | 0.534 | 1.000 | 0.361 | -0.689 |
| TRANSISTOR PARAMETER 10 | 0.029 | 0.626 | -0.105 | -0.105 | 0.150 | 0.080 | 0.737 | 0.361 | 1.000 | -0.410 |
| TRANSISTOR PARAMETER 4 | -0.083 | -0.300 | -0.188 | -0.188 | -0.757 | -0.783 | -0.530 | -0.689 | -0.410 | 1.000 |

# METHOD AND APPARATUS FOR PROCESSING DATA, AND COMPUTER PRODUCT

CROSS-REFERENCE TO RELATED APPLICATIONS

This application is based upon and claims the benefit of priority from the prior Japanese Patent Application No. 2006-161456, filed on Jun. 9, 2006, the entire contents of which are incorporated herein by reference.

BACKGROUND OF THE INVENTION

1. Field of the Invention

The present invention relates to a technology for processing data to extract significant factors based on relation between data.

2. Description of the Related Art

For example, in a semiconductor manufacturing, to improve yields, such a process is performed that factors in decreasing yields are found as speedily as possible based on various measurement data such as completion values at manufacturing stage and device characteristic data. It is especially important in development of new products or in review of existing manufacturing process to extract factors lowering the quality from the various measurement data, in order to improve efficiency and to obtain high reliability of the data analysis.

Conventionally a method of making a model representing variations of SPICE parameters has been applied in which a principal component analysis (multiple regression analysis) is conducted without taking circuit characteristic data into account, and a multiple regression equation is formed using thus obtained principal component. This method builds a variation model of SPICE parameters regardless of influence on circuit characteristics. Such a technology is disclosed in, for example, IEEE TRANSACTIONS ON SEMICONDUCTOR MANUFACTURING, vol. 7, no. 3, pp. 306-318, August, 1994, titled "Relating Statistical MOSFET Model Parameter Variabilities to IC Manufacturing Process Fluctuations Enabling Realistic Worst Case Design" by James A. Power, et al.; Technical Report of IEICE, November, 1996, SDM96-122, pp. 27-33, titled "Development of Worst Case MOSFET Model Parameter Determining Technique Using Multivariate Analysis" by Takeshi Yasuda, et al.; and Technical Report of IEICE, September, 1997, SDM97-128, pp. 63-70, titled "Statistical Analysis of MOSFET Sensitivity Using TCAD" by Naoyuki Shigyo, et al.

A data analysis technique enabling the extraction of factors lowering the quality from various measurement data includes data mining used in the field of financing, distribution, etc. The data mining is suitable for these fields because a large volume of data is handled in these fields. According to the statistical technique of the data mining, when a large number of explanatory variables associated with an objective variable are present, explanatory variables explaining the objective variable can be selected by finding features and tendency from a large volume of data based on relationship between the data.

Especially when objective variables are quantitative data, a regression tree analysis is used as a statistical technique of data mining. In the conventional regression tree analysis, when an explanatory variable and an objective variable change across a certain threshold, the effect of the explanatory variable can be easily found. Such a technology is disclosed in, for example, Japanese Patent Application Laid-Open Publication Nos. 2001-306999, 2002-324206, and 2003-142361.

Moreover, a method of judging a cause of abnormality of a plasma processing apparatus is publicly known that applies plasma processing to a material to be processed in a processing room. This method of the plasma processing apparatus includes an analysis-data acquiring step of acquiring analysis data including a plurality of parameters based on detection values acquired in each processing of the material to be processed by detectors arranged in the plasma processing apparatus; an abnormality judging step of judging whether the data represents an abnormality by analyzing the acquired analysis data; an effect calculating step of calculating a degree of effect on the abnormality for each parameter judged to be abnormal; and an abnormality-cause judging step of judging whether to be abnormal while removing an effect on the abnormality one after another in a descending order of the degree of effect of parameter, and of judging, when judged to be normal, the parameters from which the effect on the abnormality has been removed as parameters of abnormality cause. Such a technology is disclosed in, for example, Japanese Patent Application Laid-Open Publication No. 2004-349419.

However, in the above conventional method of making a variation model of SPICE parameters, which performs the multiple regression analysis, it is necessary to carefully examine outliers to remove from the data of each item of SPICE parameter. If the removal is not appropriately performed, appropriate results can not be obtained. Since the removal of outliers must be performed with respect to all SPICE parameters, an enormous amount of time is required.

In the conventional regression tree analysis of data mining, when explanatory variables have continuous values, relationship between an objective variable and an explanatory variable mildly changes. If this change is small as compared with other explanatory variables, explanatory variables associated with the objective variable (quantitative data) can not be appropriately obtained. Therefore, although effective for discrete values, the conventional regression tree analysis is not suitable for finding factors having a large degree of effect on continuous values such as SPICE parameters and circuit characteristic data.

For example, in a data group of 200 records, it is assumed that an objective variable Y and five explanatory variables of A, B, C, D, and E have a relationship expressed by the following multiple regression equation.

$$Y=1 \times A+2 \times B+(-1) \times C+5 \times D+(0.1) \times D$$

FIG. 1 illustrates a result of the regression tree analysis. As shown in FIG. 1, the explanatory variable D has a large effect on the objective variable, with "Para. D" appearing in each node of nodes n1 and n2, two parts to which a route node n0 is divided, nodes n3 and n4, two parts to which the node n1 is divided, and nodes n5 and n6, two parts to which the node n2 is divided. This regression tree diagram, however, does not indicate that the explanatory variable B has a second largest effect after the explanatory variable D.

The reason is as follows. In the regression tree analysis, a sum of square sums of objective variable of two subgroups is focused when a data group is divided into two subgroups, one subgroup of explanatory variable below a certain threshold and the other subgroup of explanatory variable exceeding the threshold. A sum of square sums for each of explanatory variables of A, B, C, D, and E is shown in FIGS. 2, 3, 4, 5, and 6, respectively. While the sum of square sums of the explanatory variable D fluctuates largely as shown in FIG. 5, fluctuation is small in the explanatory variable B and other variables.

Therefore, fluctuations of other explanatory variables are hidden behind the fluctuation of the explanatory variable D and factors other than the explanatory variable D can not be detected.

SUMMARY OF THE INVENTION

It is an object of the present invention to at least solve the above problems in the conventional technologies.

A data processing method according to one aspect of the present invention is of determining a plurality of explanatory variables that have great effect on an objective value. The processing method includes calculating a degree of association between the objective variable and each of a plurality of explanatory variables; extracting a plurality of explanatory variables based on the degree of association; calculating a degree of independence between the explanatory variables extracted based on the degree of association; selecting, from the explanatory variables, a plurality of candidates of explanatory variables that have high possibility of having a great effect on the objective variable based on the degree of association and the degree of independence; selecting an explanatory variable having a high rate of contribution to the objective variable from among the candidates; calculating a regression equation to estimate a value of the objective variable using the selected explanatory variable having a high rate of contribution; and calculating difference between the estimated value and a known measured value of the objective value. While using the difference as a new objective variable, and using explanatory variables except the selected explanatory variable having a high rate of contribution as new explanatory variables, a series of processing including the calculating a degree of association, the extracting, the calculating a degree of independence, the selecting candidates, the selecting an explanatory variable, the calculating a regression equation, and the calculating difference is repeated.

In a data processing method according to another aspect of the present invention, when a plurality of pieces of data are arranged in a descending order, and an arbitrary data point is focused among the arranged data, a data point arranged on an opposite side to the focused data point with respect to a median value is removed as an abnormal value when A/B exceeds a predetermined value, where A represents distance between the focused data point and a data point adjacent to the focused data point on a median value side, and B represents an average of distances of N-1 sets of combinations of data points adjacent to each other in N data points that are extracted from the arranged data toward the median value side from the focused data point, N being a positive integer equal to or greater then three.

A computer-readable recording medium according to still another aspect of the present invention stores therein a computer program for realizing a data processing method according to the above aspects.

A data processing apparatus according to still another aspect of the present invention determines a plurality of explanatory variables that have great effect on an objective value. The data processing apparatus includes an association calculating unit configured to calculate a degree of association between the objective variable and each of a plurality of explanatory variables; an independence calculating unit configured to calculate a degree of independence between a plurality of explanatory variables extracted based on the degree of association; a candidate selecting unit configured to select, from the explanatory variables, a plurality of candidates of explanatory variables that have high possibility of having a great effect on the objective variable based on the degree of association and the degree of independence; a variable selecting unit configured to select an explanatory variable having a high rate of contribution to the objective variable from among the candidates; a regression calculating unit configured to calculate a regression equation to estimate a value of the objective variable using the selected explanatory variable having a high rate of contribution; and a difference calculating unit configured to calculate difference between the estimated value and a known measured value of the objective value. While using the difference as a new objective variable, and using explanatory variables except the selected explanatory variable having a high rate of contribution as new explanatory variables, the association calculating unit, the independence calculating unit, the candidate selecting unit, the variable selecting unit, the regression calculating unit, and the difference calculating unit repeat performing functions thereof.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 15 is a chart of a part of data in a specific example;

FIG. 16 is a chart of a part of data in a specific example;

FIG. 19 is a graph of cumulative probability of the power source current after cleansing processing in a specific example;

FIG. 20 is a chart of 20 parameters having a large degree of association in a specific example;

FIG. 21 depicts data of a transistor parameter 11 and a transistor parameter 19 in a specific example;

FIG. 22 is a chart of degree of independence between parameters in a specific example;

FIG. 23 is a chart of degree of independence between parameters in a specific example;

FIG. 36 is a chart of 20 parameters having a large degree of association in a second round in a specific example;

FIG. 37 is a chart of degree of independence between parameters in the second round in a specific example;

FIG. 38 is a chart of degree of independence between parameters in the second round in a specific example;

DETAILED DESCRIPTION OF THE PREFERRED EMBODIMENTS

Exemplary embodiments according to the present invention will explained in detail below with reference to the accompanying drawings.

Figure 1:
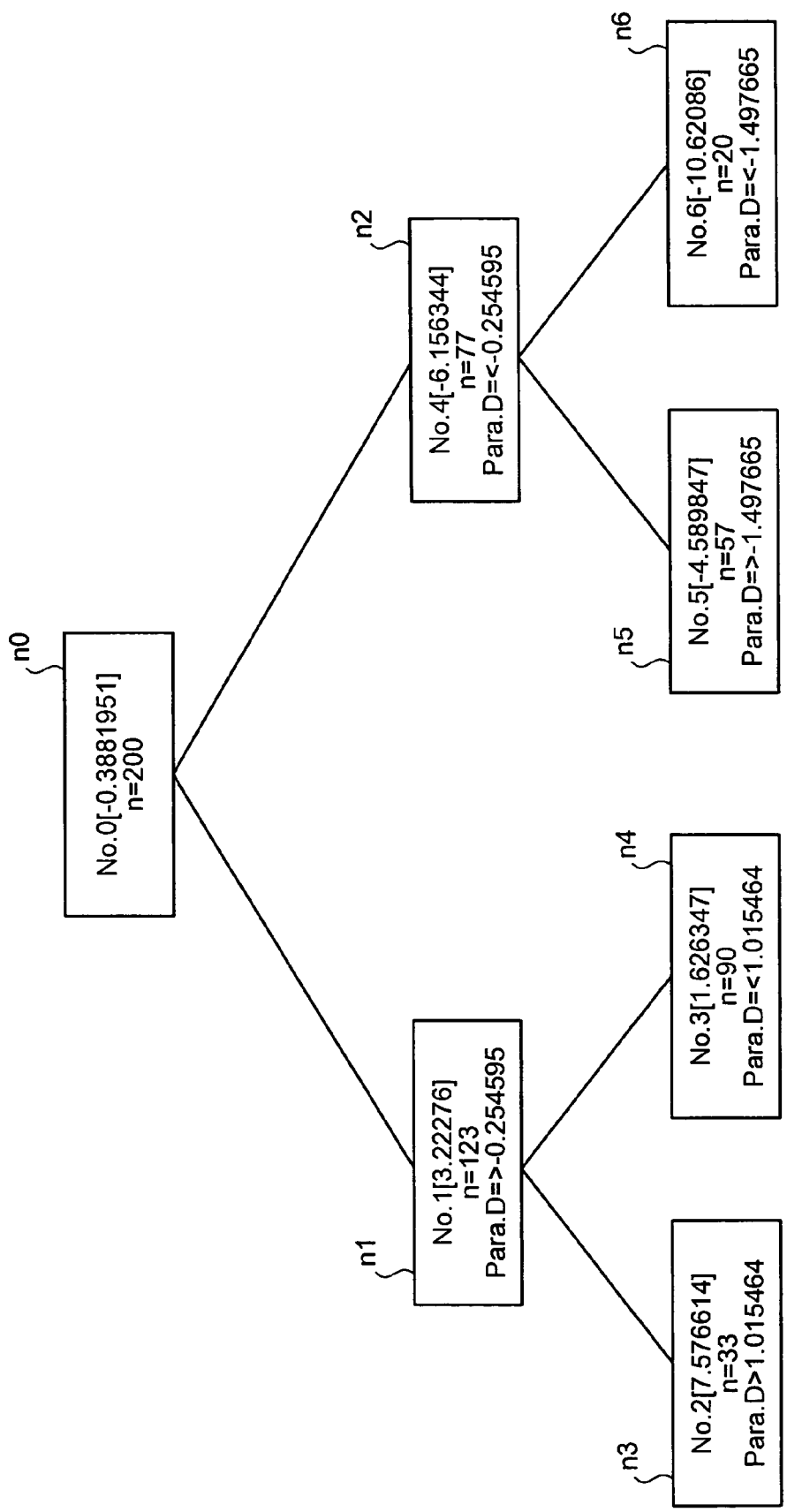
FIG. 1 is a regression tree diagram depicting a result of regression tree analysis in a conventional data mining.
Figure 2:
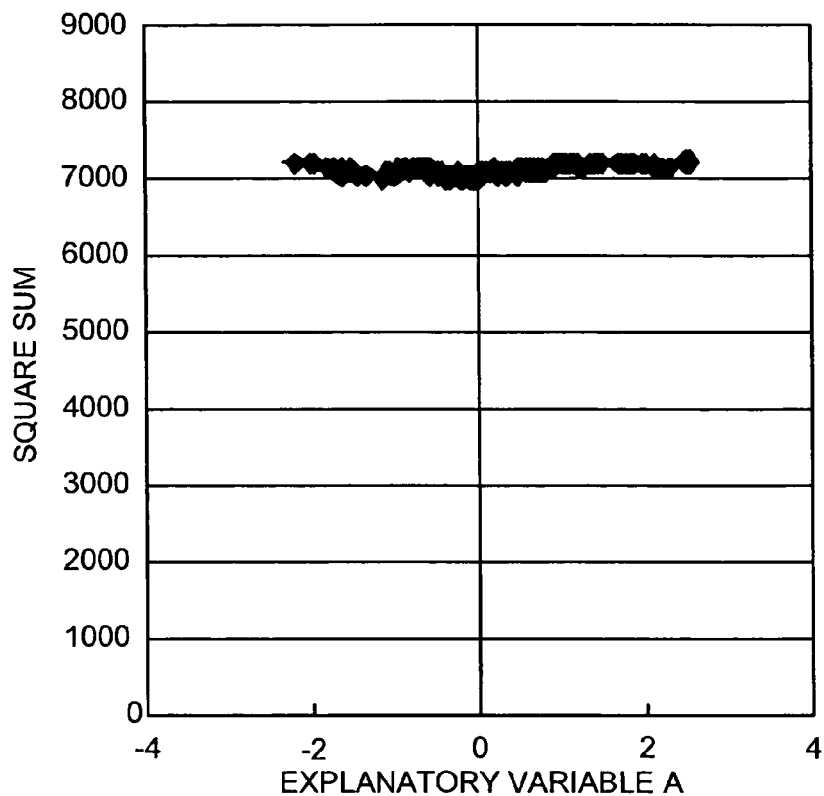
FIG. 2 is a graph of sum of square sums of explanatory variable A in the regression tree analysis shown in FIG. 1.
Figure 3:
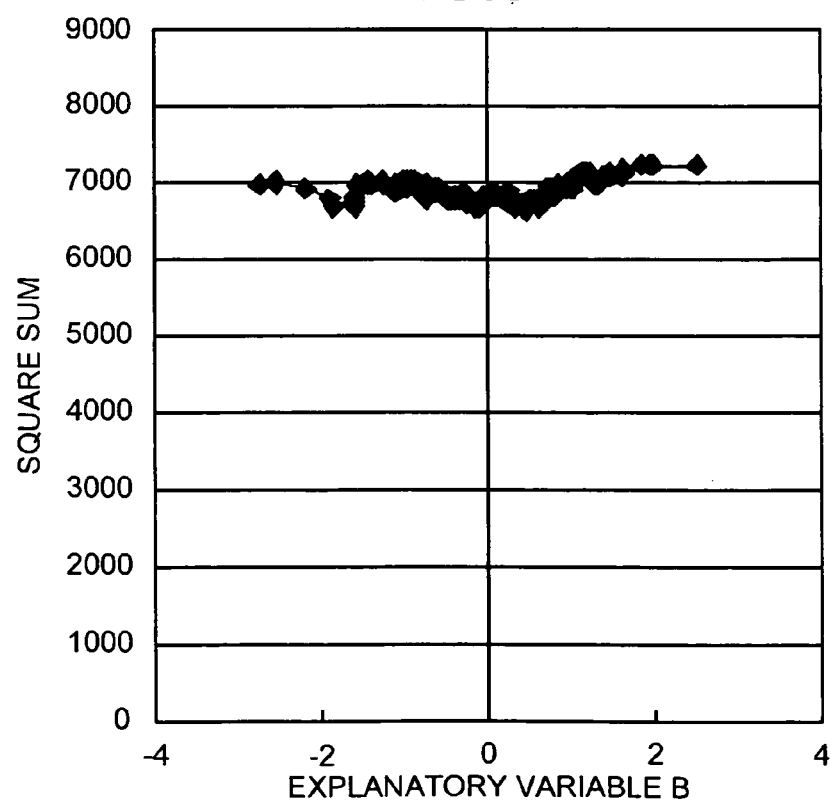
FIG. 3 is a graph of sum of square sums of explanatory variable B in the regression tree analysis shown in FIG. 1.
Figure 4:
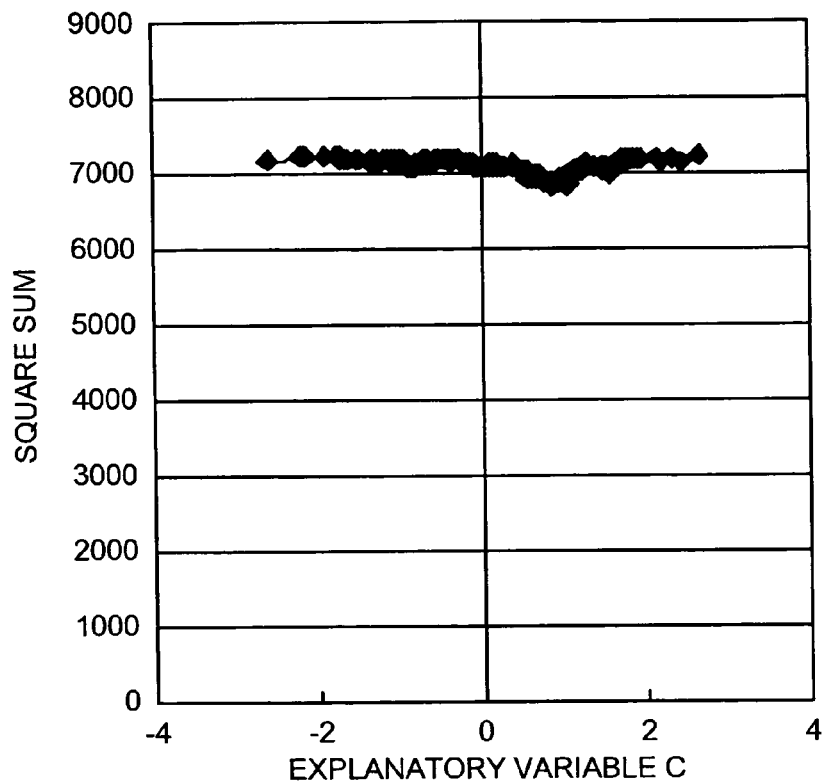
FIG. 4 is a graph of sum of square sums of explanatory variable C in the regression tree analysis shown in FIG. 1.
Figure 5:
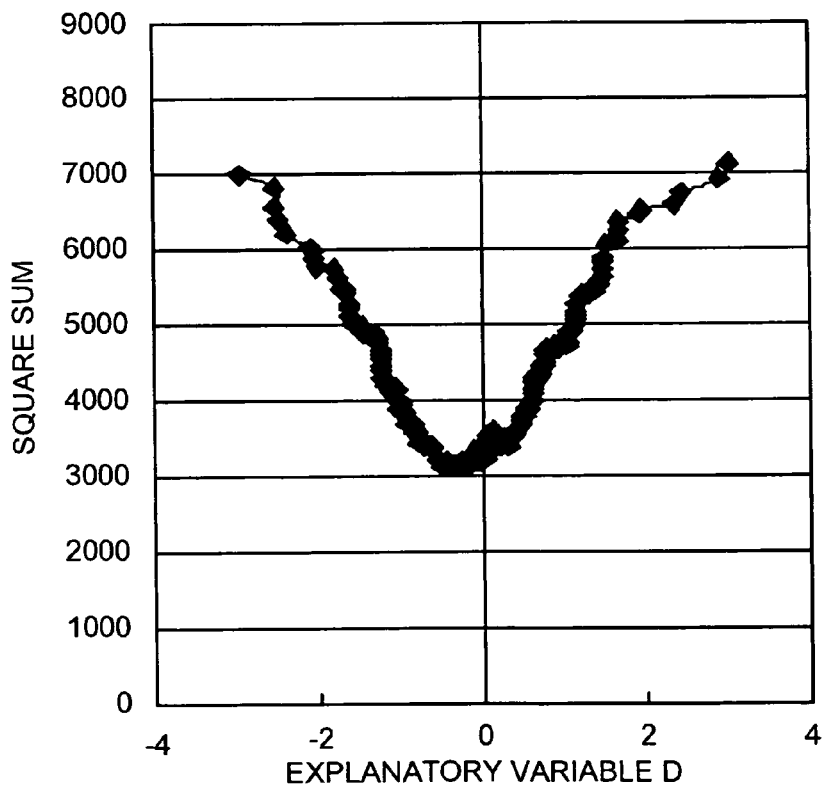
FIG. 5 is a graph of sum of square sums of explanatory variable D in the regression tree analysis shown in FIG. 1.
Figure 6:
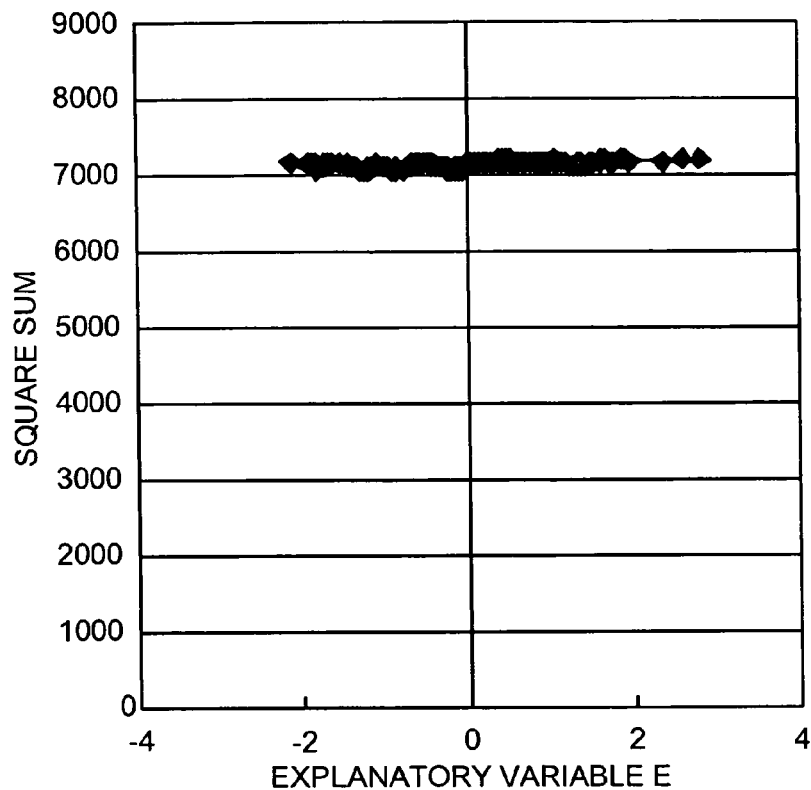
FIG. 6 is a graph of sum of square sums of explanatory variable E in the regression tree analysis shown in FIG. 1.
Figure 7:
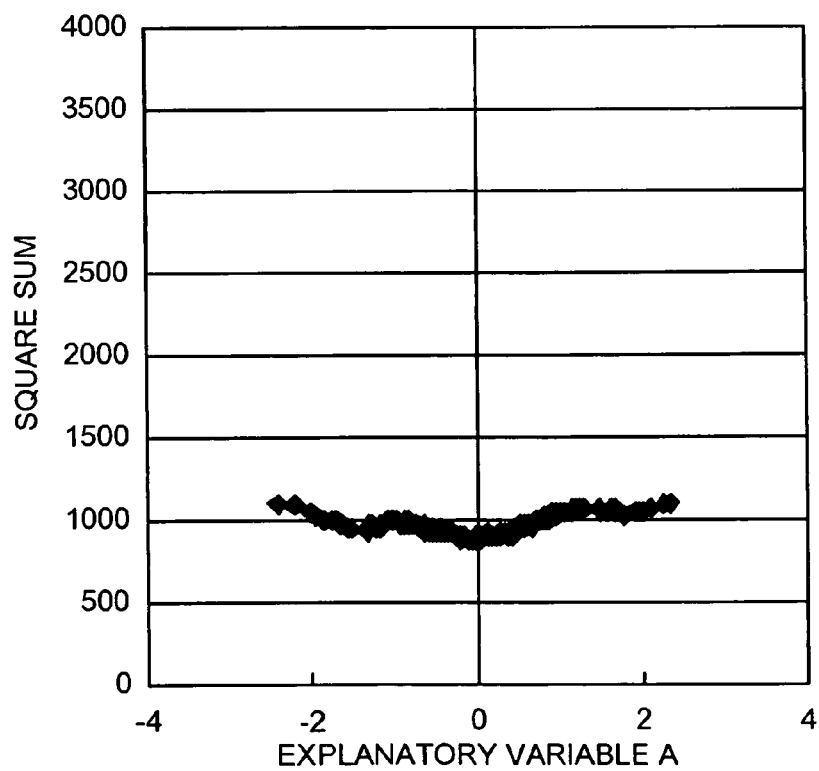
FIG. 7 is a graph of sum of square sums of explanatory variable A when effect of explanatory variable D is removed.
Figure 8:
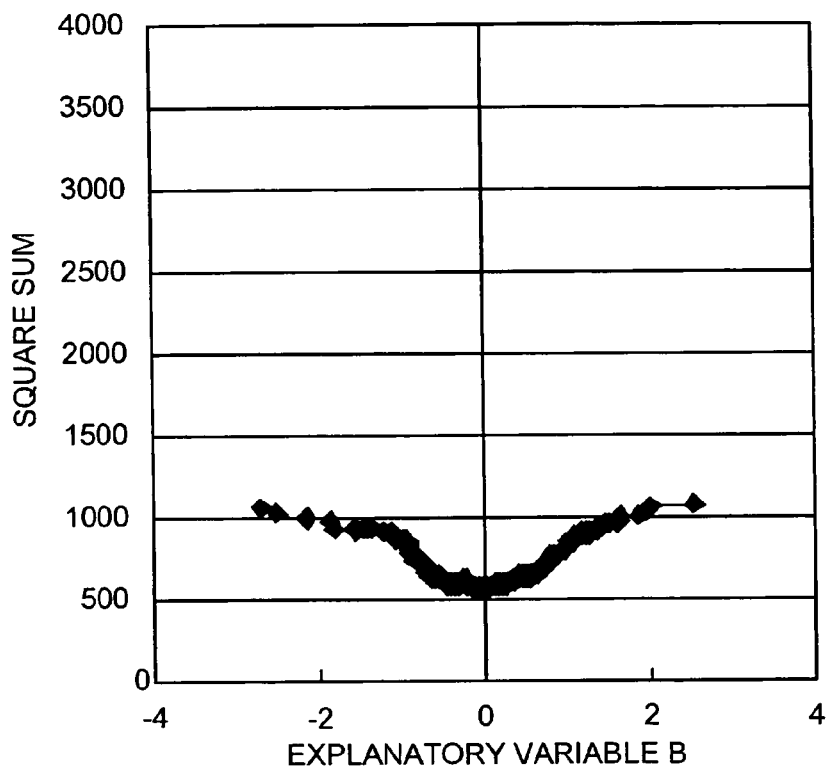
FIG. 8 is a graph of sum of square sums of explanatory variable B when effect of explanatory variable D is removed.
Figure 9:
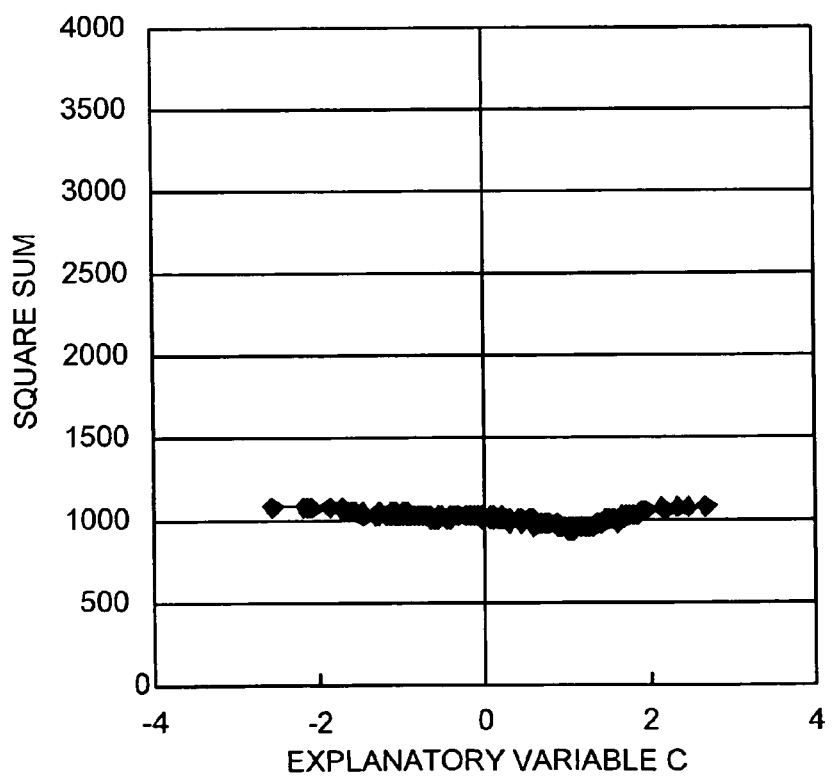
FIG. 9 is a graph of sum of square sums of explanatory variable C when effect of explanatory variable D is removed.
Figure 10:
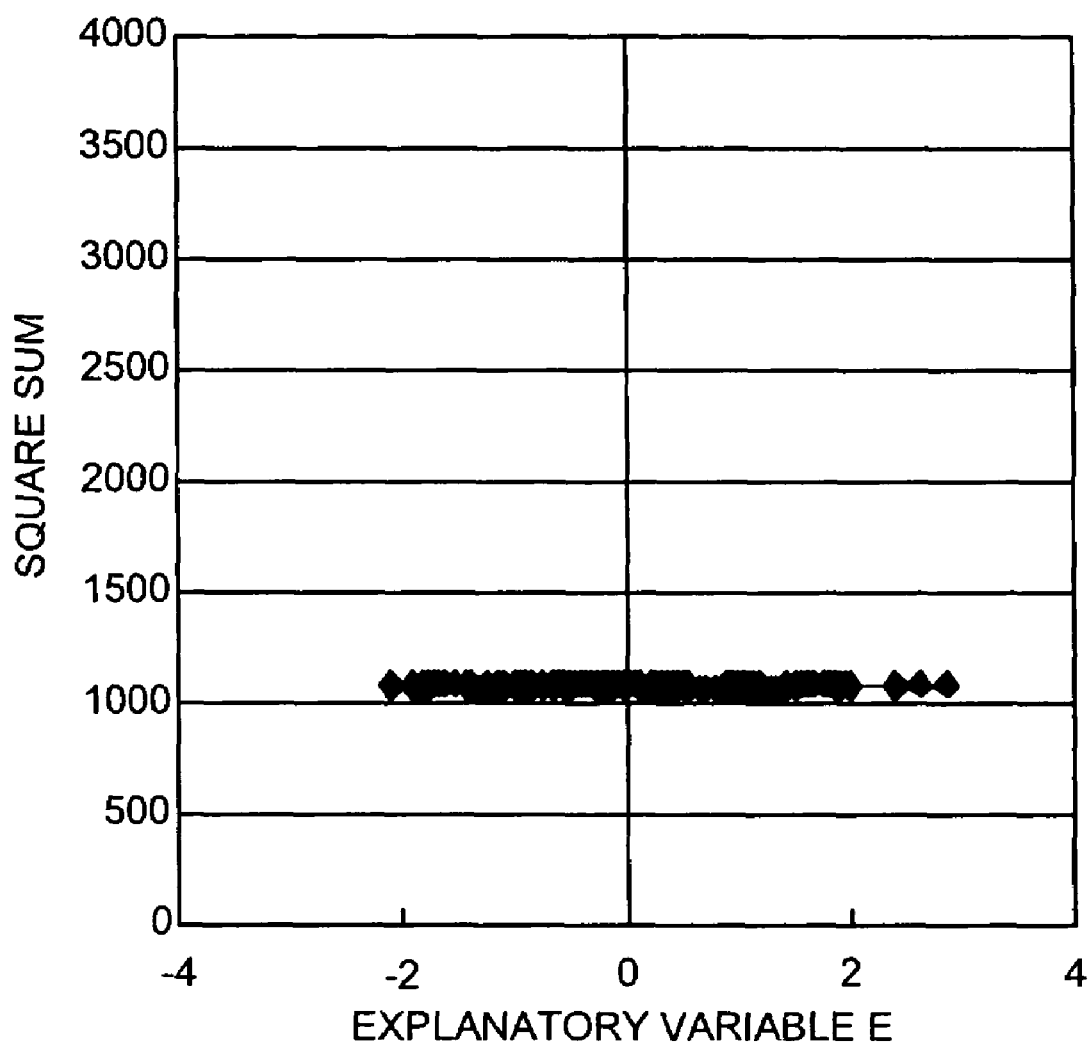
FIG. 10 is a graph of sum of square sums of explanatory variable E when effect of explanatory variable D is removed.
Figure 11:
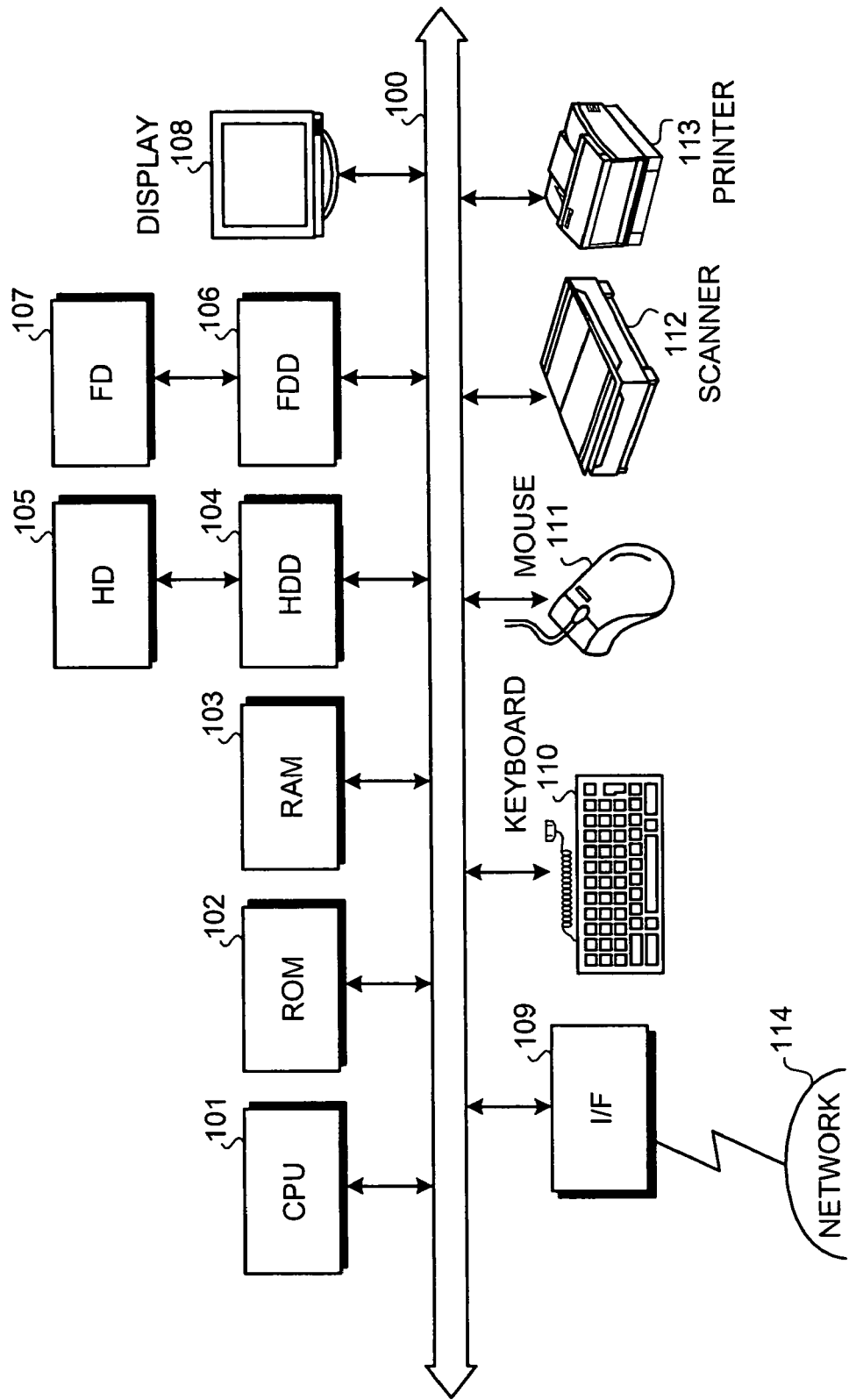
FIG. 11 is a schematic of a data processing apparatus according to an embodiment of the present invention.

FIG. 11 is a block diagram of a data processing apparatus according to an embodiment of the present invention. As shown in FIG. 11, the data processing apparatus includes a central processing unit (CPU) 101, a read-only memory (ROM) 102, a random access memory (RAM) 103, a hard disk drive (HDD) 104, a hard disk (HD) 105, a flexible disk drive (FDD) 106, a flexible disk (FD) 107 as an example of a removable recording medium, a display 108, and an interface (I/F) 109, a keyboard 110, a mouse 111, a scanner 112, and a printer 113. Components are connected to one another through a bus 100.

The CPU 100 performs overall control of the data processing apparatus. The ROM 102 stores programs such as a boot program. The RAM 103 is used as a work area of the CPU 101. The HDD 104 controls reading and writing of data from and to the HD 105 under control of the CPU 101. The HD 105 stores the data written under control of the HDD 104.

The FDD 106 controls reading and writing of data from and to the FD 107 under control of the CPU 101. The FD 107 stores the data written under control of the FDD 106 and have the data stored in the FD 107 read by the data processing apparatus.

A removable recording medium, besides the FD 107, may be a compact-disc read-only memory (CD-ROM), a compact-disc recordable (CD-R), a compact-disc rewritable (CD-RW), a magneto optical (MO) disk, a digital versatile disk (DVD), or a memory card. The display 108 displays a cursor, an icon, a tool box, and data such as document, image, and function information. The display 108 may be, for example, a cathode ray tube (CRT), a thin film transistor (TFT) liquid crystal display, or a plasma display panel.

The I/F 109 is connected to a network 114 such as the Internet through a telecommunication line and is connected to other devices through the network 114. The I/F 109 serves as an interface between the network 114 and the inside of the apparatus and controls input and output of data from and to external devices. The I/F 109 may be, for example, a modem or a local area network (LAN) adaptor.

The keyboard 110 is equipped with keys for input of characters, numerals, and various instructions, and data is input through the keyboard 110. The keyboard 110 may be a touch-panel input pad or a numeric keypad. The mouse 111 performs a cursor movement, a range selection, a movement or size change of a window. A trackball or a joystick may be used instead of the mouse 111 if similar functions as a pointing device are provided.

The scanner 112 optically reads an image and captures image data into the data processing apparatus. The scanner 112 may have an optical character recognition (OCR) function. The printer 113 prints image data and document data. The printer 113 may be, for example, a laser printer or an ink jet printer.

Figure 12:
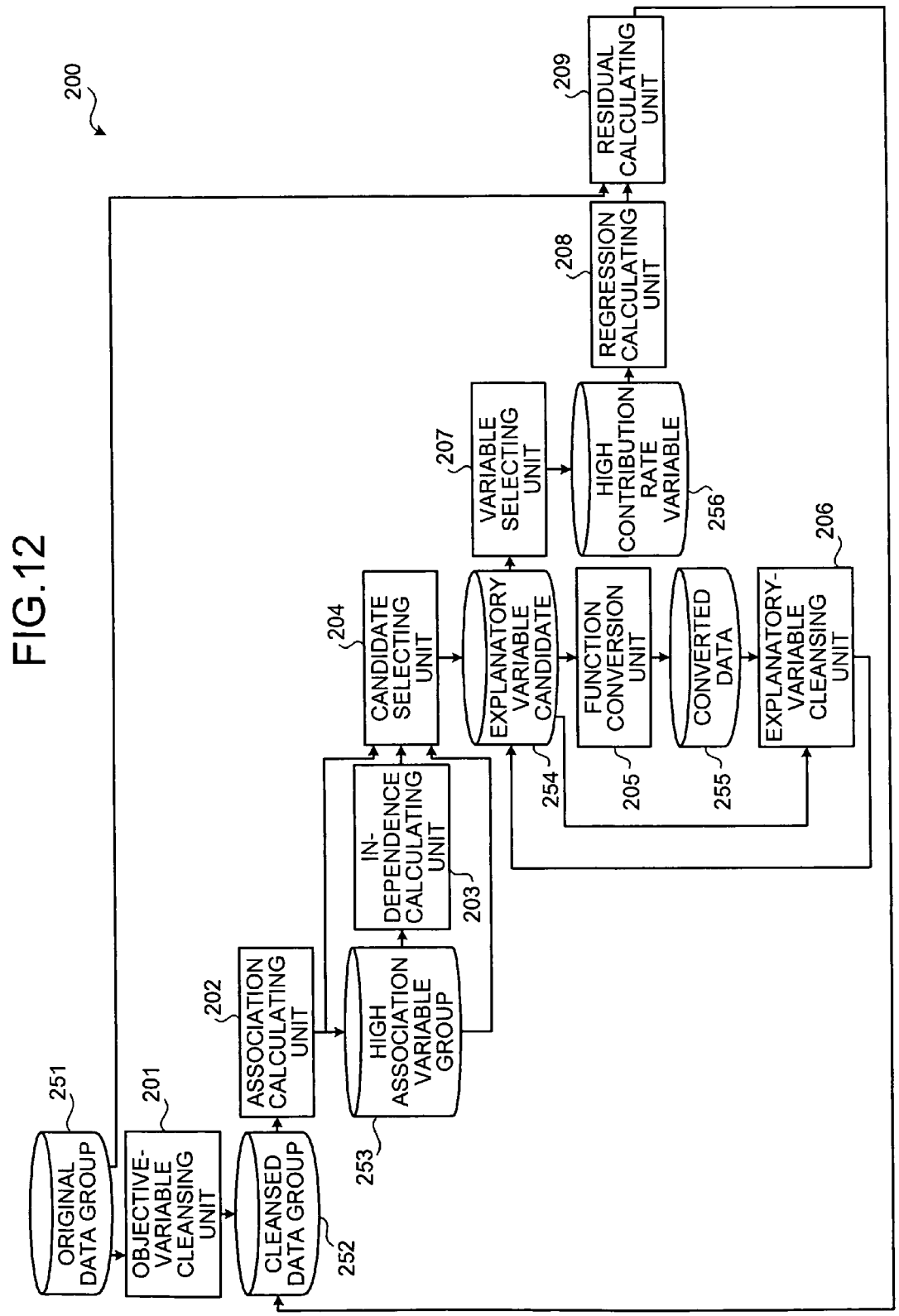
FIG. 12 is a block diagram of the data processing apparatus according to the embodiment.

FIG. 12 is a block diagram of the data processing apparatus according to the embodiment. As shown in FIG. 12, a data processing apparatus 200 includes an objective-variable cleansing unit 201, an association calculating unit 202, an independence calculating unit 203, an candidate selecting unit 204, a function converting unit 205, an explanatory-variable cleansing unit 206, an explanatory variable selecting unit 207, a regression calculating unit 208, and a residual calculating unit 209.

An original data group 251 includes a plurality of records including data of an objective variable having characteristics of continuous values and data of a plurality of explanatory variables having characteristics of continuous values associated with the objective variable, as objects of data processing. A principal component analysis may be applied to a plurality of explanatory variables and a principal component obtained by this principal component analysis may be used in place of explanatory variables. When discrete values are included in explanatory variables, a statistic value may be obtained for data of the same explanatory variable, and a new value may be calculated based on each piece of data and this statistic value, and this new value may be added to the explanatory variable.

A difference of each piece of data from an average of each data group, a difference of each piece of data from a median value of each data group, or a normal probability value may be used as the statistic value and the new value in such a case. When positional information shown by data is included as additional information associated with objective variable and explanatory variable, an average or a median value of adjacent data may be used as the statistic value. When the positional information has data in grating state, the adjacent data may be five pieces of data including the data above and below, and left and right of current data, or nine data with the data in 4 oblique directions added to the five pieces data. The explanatory variable including the explanatory variable to which the above-mentioned various processing is applied is hereinafter referred to as the explanatory variable.

The objective-variable cleansing unit 201 removes abnormal values from the objective variables stored in the original data group 251 as described below and obtains a cleansed data group 252 from which explanatory variables are to be extracted. First, out of all records, overlapping records whose objective variable is of the same value are removed. Remaining records are rearranged in an ascending order of data of objective variable and attention is focused on an arbitrary data point out of the data of objective variable in ascending order. The distance (A) is obtained between this focused data point and a data point adjacent to the focused data point toward the median value.

N (N is a positive integer equal to or greater than three) pieces of data points from the focused data point toward data at median value side is extracted, and an average (B) of distances of N−1 sets of combinations of data points adjacent to each other out of N pieces of extracted data points is obtained. When a value of A/B exceeds a predetermined value, the data point on the opposite side to the focused data point with respect to the median value is determined as an abnormal value, and the record of the focused data point and the record of the data point existing on the opposite side of the median value from the focused data point are removed.

Preferably, N is three to eight, and more preferably, five. The value A/B is preferably a value of 10 to 20 and more preferably, 15. The distance between data points adjacent to each other may be the distance in the normal cumulative probability chart.

The association calculating unit 202 calculates a degree of association between the objective variable and explanatory variables included in the cleansed data group 252. For example, the association calculating unit 202 groups all data included in the cleansed data group 252 into two, a first data group constituted by records in which value of the explanatory variable is equal to or smaller than a threshold and a second data group constituted by records in which value of the explanatory variable is larger than the threshold. Then, calculation is made of a value t expressed by the following equation as a degree of association, between the objective variable and each of all explanatory variables, provided, however, that the threshold of the explanatory variable is determined so that the value t becomes the largest between the minimum value and the maximum value of the objective variable.

$$\text{value } t = \frac{|Avg(G1) - Avg(G2)|}{\sqrt{\frac{S1+S2}{N1+N2-2} \times \left(\frac{1}{N1}+\frac{1}{N2}\right)}} \quad (1)$$

where G1 and G2 represent a set of the objective variable of the first data group and the second data group respectively, Avg(G1) and Avg(G2) represent an average of the objective variable of the first data group and the second data group respectively, N1 and N2 represent the number of records of the first data group and the second data group respectively, and S1 and S2 represent a square sum of the objective variable of the first data group and the second data group respectively.

Using the value t, data is prepared that shows a relationship of [explanatory variable-threshold-degree of association (value t)-N1-N2]. Data of the explanatory variable is divided into two, a group of data below the threshold and a group of data above the threshold. The size of the data group in which an average of the objective variable is small is given as N1 and the size of the data group in which an average of the objective variable is large is given as N2. Alternately, calculation may be made of an order correlation coefficient between an objective variable and an explanatory variable, as a degree of association. In this case, data is prepared that shows a relationship of [explanatory variable-degree of association (order correlation coefficient)]. Alternatively, calculation may be made of a degree of unification between the first data group and the second data group, or of a correlation coefficient between the objective variable and the explanatory variable, as a degree of association. Based on the degree of association obtained by calculation, a plurality of explanatory variables 253 having a high degree of association (high association variable group) are extracted out of the cleansed data group 252.

The independence calculating unit 203 calculates a degree of independence between explanatory variables included in the explanatory variables 253 having a high degree of association. For example, the independence calculating unit 203 selects two arbitrary explanatory variables T1 and T2 among the explanatory variables 253 having a high degree of association, and focusing attention on values of one explanatory variable T1, groups the data into two, a third group of data in which the value of the explanatory variable T1 is equal to or smaller than a threshold and a fourth group of data in which the value of the explanatory variable T1 is larger than the threshold. Then, calculation is made of a ratio of correspondence or non-correspondence between the other explanatory variable T2 belonging to the third data group and the other explanatory variable T2 belonging to the fourth data group, as a degree of independence.

Alternatively, a value t expressed by the following equation may be calculated with respect to the third data group and the fourth data group, as a degree of independence.

$$\text{value } t = \frac{|Avg(G3) - Avg(G4)|}{\sqrt{\frac{S3+S4}{N3+N4-2} \times \left(\frac{1}{N3} + \frac{1}{N4}\right)}} \qquad (2)$$

where G3 and G4 represent a set of the other explanatory variable belonging to the third data group and the fourth data group respectively, Avg(G3) and Avg(G4) represent an average of the other explanatory variable belonging to the third data group and the fourth data group respectively, N3 and N4 represent the number of records of the third data group and the fourth data group respectively, and S3 and S4 represent a square sum of the other explanatory variable belonging to the third data group and the fourth data group respectively.

Alternatively, to obtain a degree of independence, calculation may be made of a correlation coefficient or an order correlation coefficient between any two arbitrary explanatory variables 253 included in the explanatory variables having a high degree of association. A degree of independence may be calculated as follows: Selection is made of two arbitrary explanatory variables T3 and T4 included in the cleansed data group 252. The number of data in N1 (the data group in which an average of the objective variable is smaller) of the explanatory variable T3 and the data included in N1 (the data group in which an average of the objective variable is smaller) of the explanatory variable T4 is given as NLL. The number of data included in N2 (the data group in which an average of the objective variable is larger) of the explanatory variable T3 and the data included in N2 (the data group in which an average of the objective variable is larger) of the explanatory variable T4 is given as NHH.

Suppose the number of all data is N, DL and DH are given as follows:

$DL = 2 \times NLL/(N+NLL-NHH)$ $DH = 2 \times NHH/(N+NHH-NLL)$ then the degree of independence is determined as:

degree of independence = $DL+DH-1$

The candidate selecting unit 204, based on the degree of association and the degree of independence, selects a plurality of explanatory variables with a high possibility of having a great effect on the objective variable, in the descending order of degree of association, from explanatory variables included in the explanatory variables 253 having a high degree of association as explanatory variable candidates. In this process, variables having a low degree of independence between explanatory variables are excluded. For example, when using the degree of independence determined as described above, variables whose absolute value of the degree of independence is 0.6 or higher should preferably be excluded.

When a threshold of an explanatory variable has been obtained together with a degree of association by the association calculating unit 202, the selection of explanatory variable candidates may be made based on the degree of association, the degree of independence, and this threshold.

For example, when the data showing the relationship of [explanatory variable-threshold-degree of association (value t)-N1-N2] is prepared at the association calculating unit 202 (a first case), the data is excluded whose N1 or N2 is equal to or less than 5% of the number of records of the cleansed data group 252. Then, the explanatory variable having the largest value t indicative of the degree of association is excluded. Alternatively, when the data showing the relationship of [explanatory variable-degree of association (order correlation coefficient)] is prepared at the association calculating unit 202 (a second case), the explanatory variable having the largest degree of association is excluded.

In either of the first case and the second case, an explanatory variable whose degree of independence with respect to an excluded explanatory variable is, for example, 0.6 or higher is correlated with such excluded explanatory variable and therefore, is excluded. By repeatedly applying same processing to remaining explanatory variables, for example, five explanatory variables are selected out of a plurality of explanatory variables included in the explanatory variables 253 having a high degree of association.

The function converting unit 205 prepares a scatter plot of a relationship of each explanatory variable candidate included in the explanatory variable candidates 254 and an objective variable. From the scatter plot, the function converting unit 205 focuses attention on a shape of an approximate curve, whether the relationship of the two variables is a relationship expressed by any of various functions such as a linear relationship, a relationship of $y=1/x$, a relationship of $y=\log x$, a relationship of $y=e^x$, and a relationship of $y=\sqrt{x}$, or a relationship expressed by a function with two or more of these functions combined.

As to the explanatory variables that are confirmed as having a curve shape other than a linear relationship, the function converting unit 205 makes conversion according to the applicable type of function and obtains function-converted data 255. However, when a correlation coefficient between a function-converted explanatory variable and the objective variable is smaller than a constant value, the function conversion is not made. The constant value can be, for example, an arbitrary value within the range of 0.3 to 0.5. The explanatory-variable cleansing unit 206 removes abnormal values of explanatory variables in a similar way as done by the objective-variable cleansing unit 201. When the function conversion is made, abnormal values are likewise removed from the explanatory variables after the function conversion.

The explanatory variable selecting unit 207 selects, from the explanatory variable candidates 254 selected by the candidate selecting unit 204 or the explanatory variable candidates 254 reflecting the function conversion thereof by the function converting unit 205, explanatory variables 256 having a high rate of contribution to the objective variable. For example, for each case from the case where the number of explanatory variables is one to the case where the number of explanatory variables is the largest number of explanatory variables included in the explanatory variable candidates 254, a combination whose multiple correlation coefficient is the largest is found out by using a round-robin method of the multiple regression analysis. A cumulative contribution rate is also calculated for each of these combinations. Out of explanatory variables included in the explanatory variable candidates 254, selection is made of explanatory variables until just before the amount of change becomes equal to or less than 4% as the number of explanatory variables increases, based on the relationship of the number of explanatory variables and the cumulative contribution rate.

In this process, selection may be made of explanatory variables until the cumulative contribution rate comes to a certain value, or selection may be made of explanatory variables when an increase of the cumulative contribution rate is more than a certain value, or selection may be made of explanatory variables when the amount of change of the cumulative contribution rate is more than a certain value. Alternatively, two or more of these three methods may be combined. The certain value of cumulative contribution rate may be a value of 70% to 95%. A variable increase method or variable decrease method or variable increase decrease method may be used in place of the round-robin method.

The regression calculating unit 208 performs a multiple regression analysis between explanatory variables having a high rate of contribution to the objective variable (high contribution rate variables) and the objective variable, prepares a regression equation, and calculates an estimated value of the objective variable for each record, using the regression equation. The residual calculating unit 209 calculates a difference between estimated values of the objective variable and known measured values of the objective variable. Units of the data processing apparatus 200 repeatedly perform their respective functions using the residuals obtained by the residual calculating unit 209 as a new objective variable and remaining explanatory variables except the explanatory variables selected by the explanatory variable selecting unit 207 as new explanatory variables. The data processing apparatus 200 performs repetitive process of using the residuals of the objective variable as a new objective variable until the cumulative contribution rate reaches a predetermined value. Thus, a plurality of explanatory variables having a great effect on the objective variable, namely, principal component items, are determined out of the original explanatory variables.

In the case of making a SPICE parameter variation model using the data processing apparatus 200 configured as described above, the original data group 251 has in storage a model parameter indicative of transistor characteristics, a model parameter indicative of resistor element characteristics, a model parameter indicative of capacitance characteristics, three circuit characteristic data of power source current, gain, and noise factor indicative of circuit characteristics. In this case, the objective variable is three circuit characteristic data, and explanatory variables are model parameters indicative of characteristics of a transistor, a resistor element, and a capacitance. When a plurality of objective variables is present as shown above, each unit of the data processing apparatus 200 performs the above-mentioned processing with respect to each objective variable. The principal component analysis may be applied to a plurality of objective variables and the principal component obtained by the principal component analysis may be used in place of the objective variables.

The objective-variable cleansing unit 201, the association calculating unit 202, the independence calculating unit 203, the candidate selecting unit 204, the function converting unit 205, the explanatory-variable cleansing unit 206, the explanatory variable selecting unit 207, the regression calculating unit 208, and the residual calculating unit 209 described above realize functions thereof by, for example, the CPU 101 executing a program recorded on recording media such as the ROM 102, the RAM 103, and the HD 105 shown in FIG. 11 or by the I/F 109. The original data group 251, the cleansed data group 252, the plurality of explanatory variables 253 having a high degree of association, the explanatory variable candidates 254, the function-converted data 255, and the explanatory variables 256 having a high degree of contribution to the objective variable are stored, for example, in recording media such as the HD 105 and FD 107 shown in FIG. 11 or in another device connected to the network 114 through way of the I/F 109.

Figure 13:
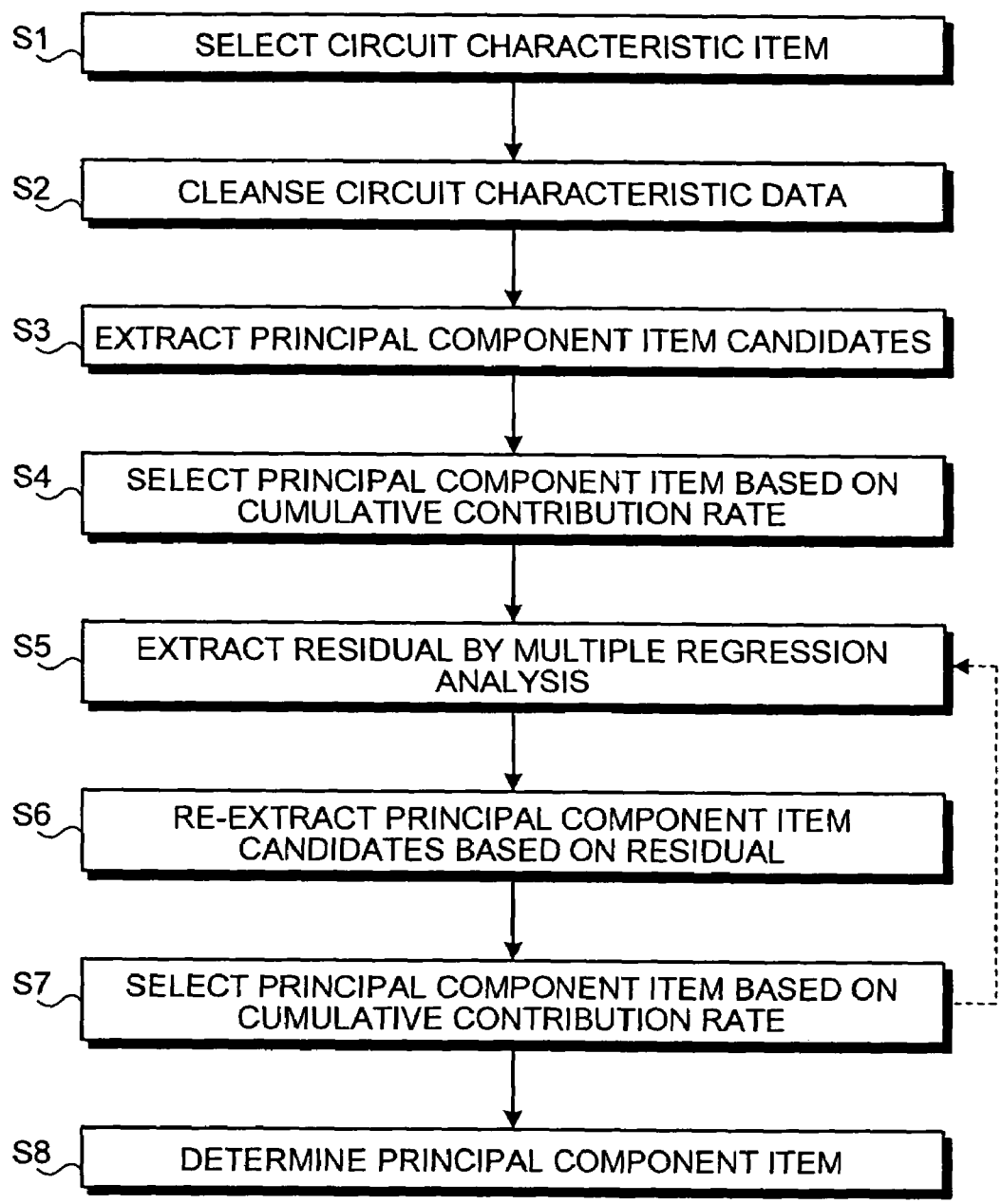
FIG. 13 is a flowchart of data processing up to principal component item determination according to the embodiment.

Description will be made, considering the circuit characteristic data as objective variable and model parameters indicative of transistor, resistor element, and capacitance characteristics as explanatory variables. FIG. 13 is a flowchart of the data processing according to the embodiment up to the principal component item determination.

As shown in FIG. 13, when a plural circuit characteristic items are present, an operator selects a circuit characteristic item as an object of analysis (step Si). Then, the data of the selected circuit characteristic item undergoes a cleansing processing by the objective-variable cleansing unit 201 (step S2). A cleansing processing may be applied to the model parameters as explanatory variables to remove abnormal values.

Next, candidates of the principal component item, namely, explanatory variable candidates 254, are extracted by the association calculating unit 202, the independence calculating unit 203, and the candidate selecting unit 204 (step S3). Extracted candidates of the principal component item undergo a function conversion by the function converting unit 205, if necessary, and an explanatory variable cleansing processing by the explanatory-variable cleansing unit 206. Then, the explanatory variable selecting unit selects principal component items, namely, the explanatory variables 256 having a high degree of contribution to the objective variable, based on, for example, the cumulative contribution rate (step S4).

Next, the regression calculating unit 208 performs the multiple regression analysis and the residual calculating unit 209 extracts residuals of the objective variable (step 5S). Then, using the residuals as a new objective variable, candidates of principal component item are extracted (step S6). Thus extracted candidates of principal component item undergoes a function conversion by the function converting unit 205 and an explanatory variable cleansing processing by the explanatory-variable cleansing unit 206, as required, and principal component items are selected by the explanatory variable selecting unit 207, based on, for example, a cumulative contribution rate (step S7). By repeatedly applying the steps 5 to 7 to the principal component items selected at the step S7, the principal component items are ultimately determined (step S8).

Figure 14:
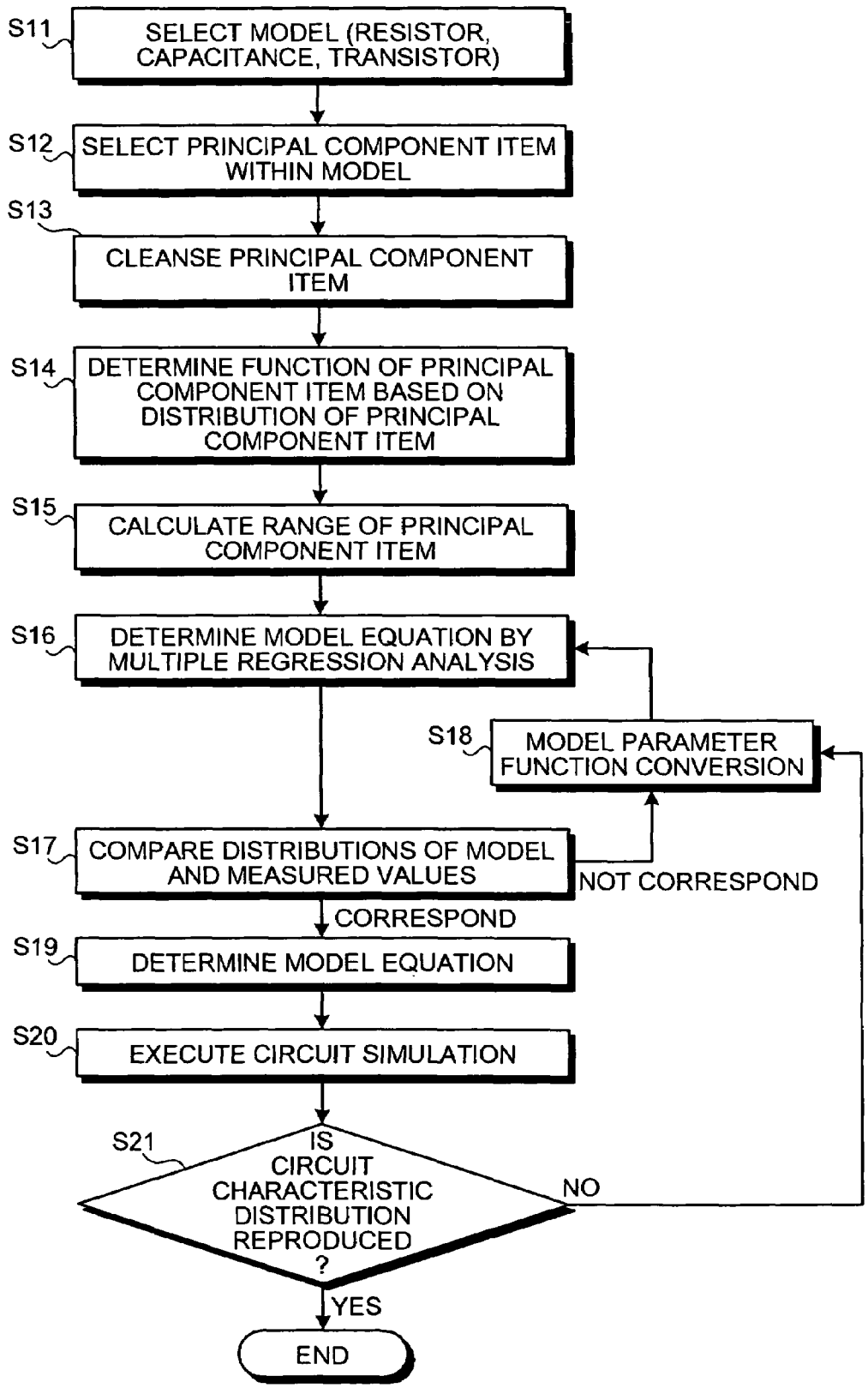
FIG. 14 is a flowchart of data processing up to model equation determination according to the embodiment.

FIG. 14 is a flowchart of the data processing according to the embodiment up to the model equation determination. As shown in FIG. 14, an operator firstly selects one model out of the resistor model, the capacitance model, and the transistor model (step S11). Next, the operator selects one out of the principal component items determined by the series of processing shown in FIG. 13, with respect to the selected model (step S12). Then, the cleansing processing of the principal component item is performed in a similar way as in the cleansing processing of the objective variable (step S13).

Then, a function of the principal component item is determined based on a distribution of the principal component item (step S14) and a range of the principal component item is calculated (step S15). Next, a multiple regression analysis is performed and a model equation is tentatively determined (step S16). Comparison is made of distributions of a model according to this tentative model equation and of measured values (step S17). Prior to determining the tentative model equation, a function conversion of model parameters may be made. As a result of the comparison, if the distributions of the model and measured values do not correspond (step S17: NOT CORRESPOND), a function conversion of the model parameters is performed (step S18) and again a tentative model equation is determined by the multiple regression analysis (step S16), and comparison is made of distributions of the tentative model and of measured values (step S17).

As a result of comparison, if the distributions of the model and measured values correspond (step S17: CORRESPOND), then the tentative model equation is determined as true model equation (step S19). Then, a circuit simulation is executed, using the true model equation (step S20). If a circuit characteristic distribution can be reproduced (step S21: YES), then a series of processing shown in FIG. 14 is finished. If the circuit characteristic distribution can not be reproduced (step S21: No), then the process goes back to the step S18 and the process is repeated starting from the function conversion of the model parameter.

Description will then be made of specific examples, with reference to FIGS. 15 to 49. Specific examples of data used for the analysis are shown in FIGS. 15 and 16. Data tables in FIGS. 15 and 16 should naturally be one data table, but the table is divided into two parts for ease of reading. This table has 525 records as the number of data and the data represents the data obtained for each of 12 chips. Each chip has circuits and elements of resistor, capacitance and transistor.

Data of a power source current, a gain, and a noise factor as circuit characteristics is measured from the circuit. Each element is measured, each element is modeled, and model parameters thereof are obtained. With respect to these elements, the resistor model has 11 model parameters, the capacitance model has 6 model parameters, and the transistor model has 44 model parameters. Therefore, in total 64 (=3+11+6+44) kinds of data are obtained from each chip. The obtained data has record number, wafer number and chip coordinates (X, Y) as supplementary information.

Figure 17:
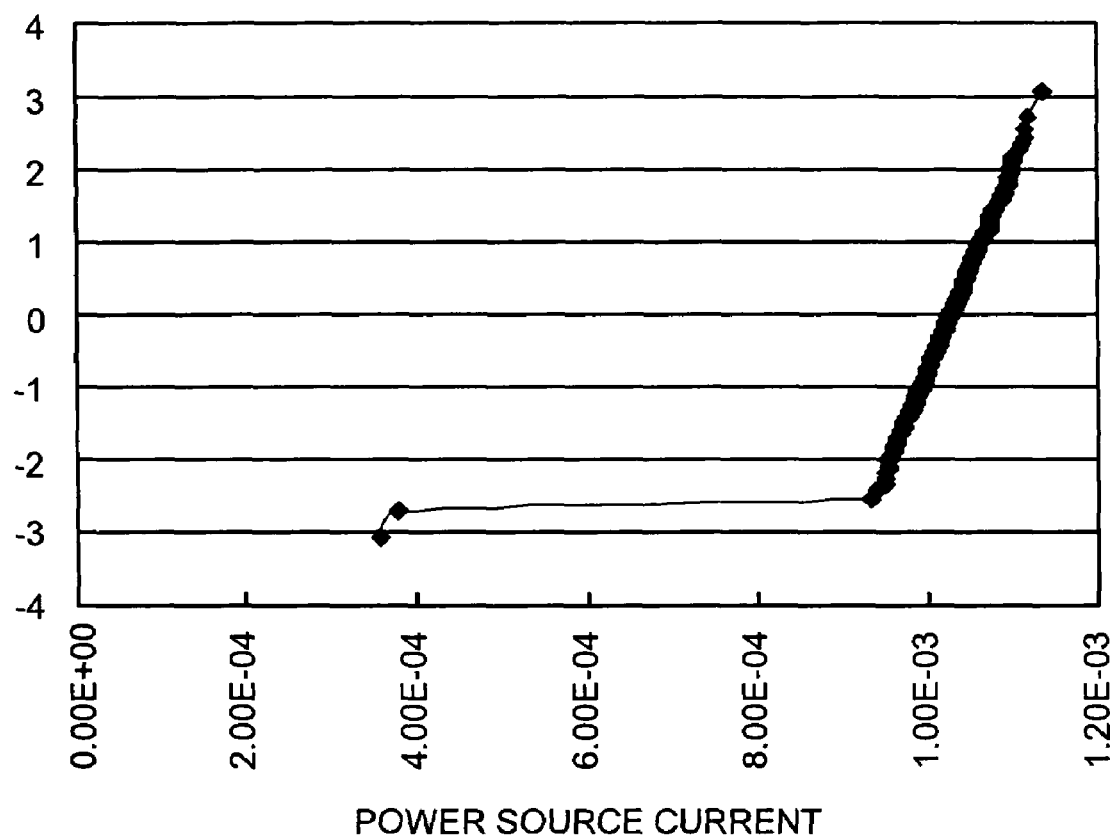
FIG. 17 is a graph of a cumulative probability of a power source current of all data in a specific example.

Description will be made of the case of analyzing the power source current of circuit characteristic data. FIG. 17 is a cumulative probability chart of the power source current of all data measured. First, circuit characteristic data is cleansed. Overlapping data is removed from the values of the power source current. Data is rearranged in the ascending order of the power source current value, and the largest data is called the first data, and 6 pieces of data from the first data toward the median value is respectively called the second data, the third data, the fourth data, the fifth data, and the sixth data.

When an average of differences of two pieces of data adjacent to each other as to five pieces of data from the second data to the sixth data is given as B and the difference of the first data and the second data is given as A, the ratio A/B is given as C. The same processing is continuously performed as to the second, the third ... from the largest data and the ratio C of A/B is obtained until the median value is reached. Likewise, from the smallest data, the same processing is continuously performed and the ratio C of A/B is obtained until the median value is reached. A graph plotting thus obtained ratio C values relative to the power source current is shown in FIG. 18.

Figure 18:
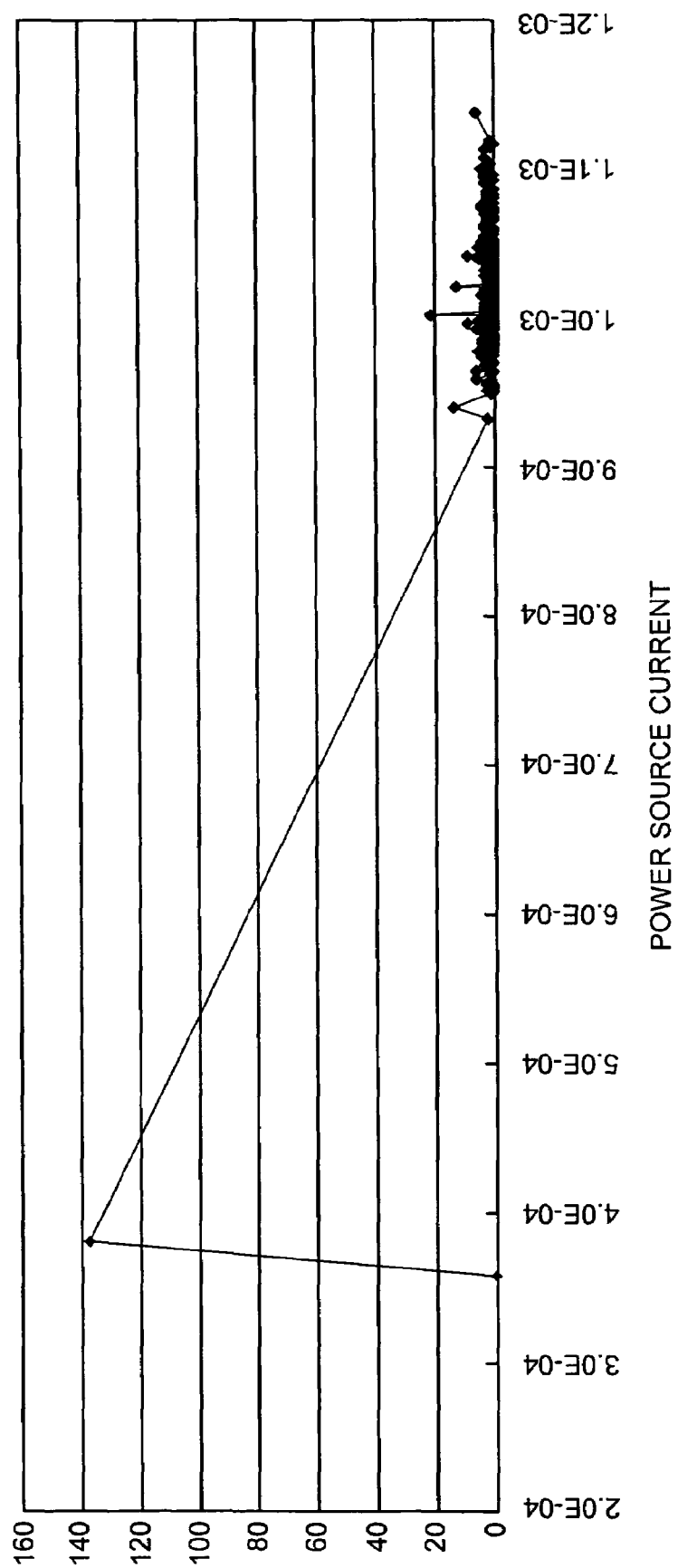
FIG. 18 is a graph of relationship between the power source current and a ratio C of difference A between focused data and adjacent data thereof to average B of differences of five pieces of adjacent data from the focused data toward median value side in a specific example.
Figure 24:
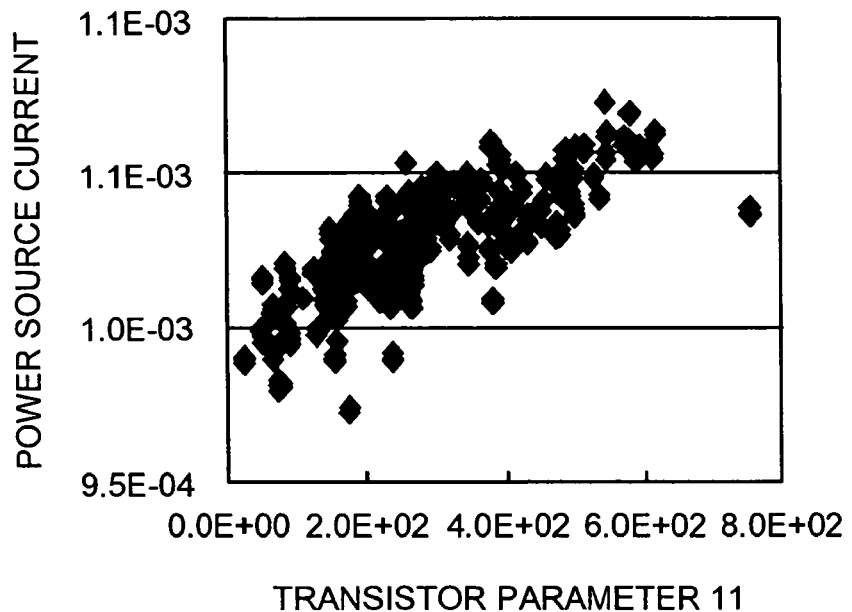
FIG. 24 is a scatter diagram of relationship between the transistor parameter 11 and the power source current in a specific example.
Figure 25:
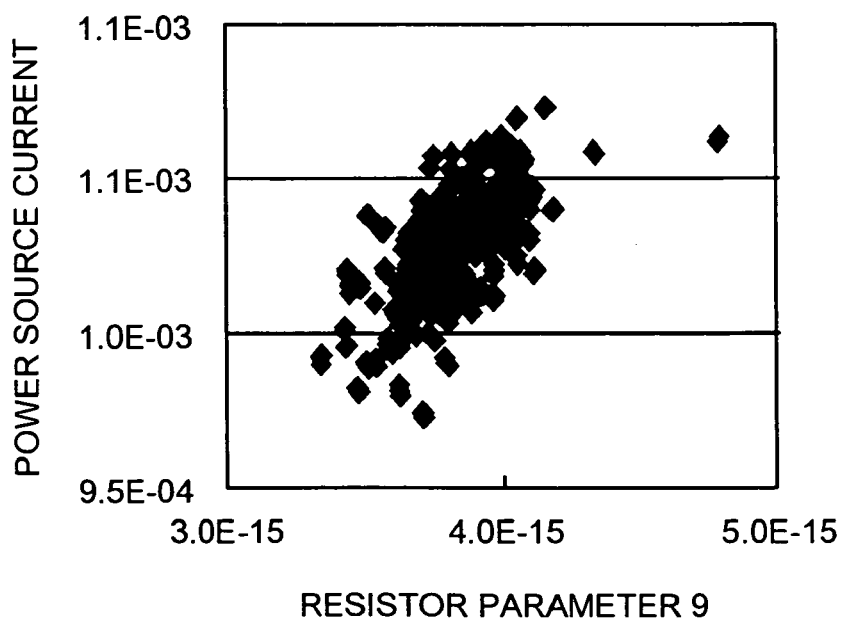
FIG. 25 is a scatter diagram of relationship of a resistor parameter 9 and the power source current in a specific example.
Figure 26:
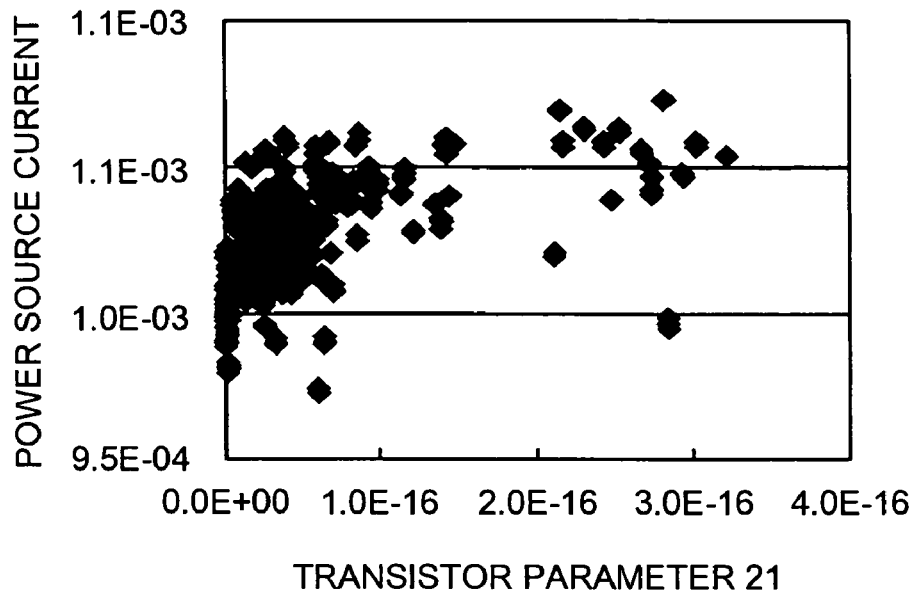
FIG. 26 is a scatter diagram of relationship between a transistor parameter 21 and the power source current in a specific example.
Figure 27:
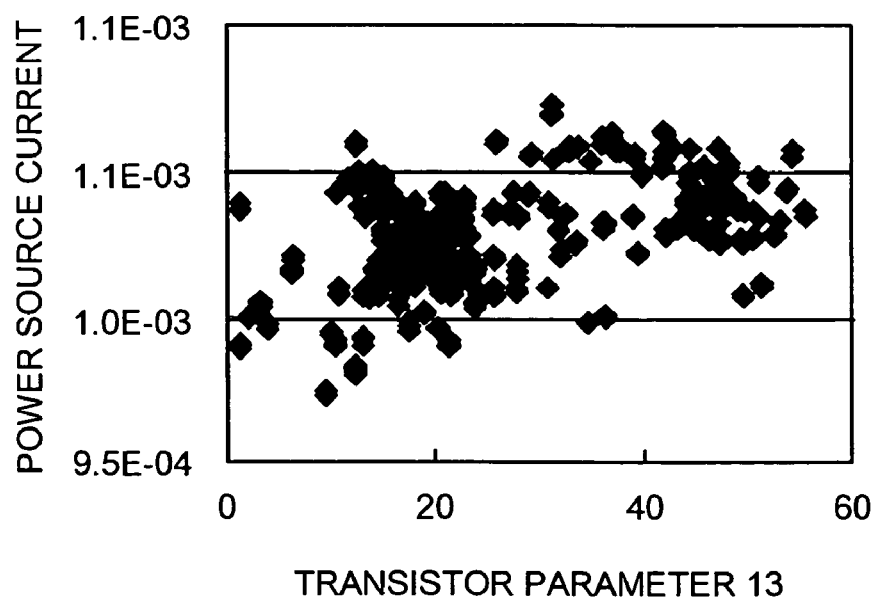
FIG. 27 is a scatter diagram of relationship between a transistor parameter 13 and the power source current in a specific example.
Figure 28:
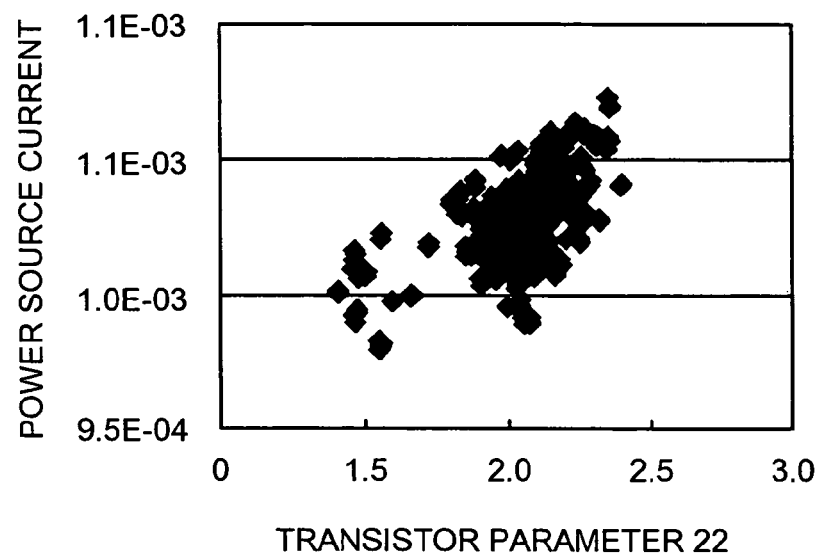
FIG. 28 is a scatter diagram of relationship between a transistor parameter 22 and the power source current in a specific example.

In the example shown in FIG. 18, the data outside the data at which the ratio C exceeds 15 is judged as an outlier. In the graph of FIG. 18, since the value of the ratio C exceeds 15 between 8.0E-04 and 9.0E-04, two pieces of data at the left of this data is judged as an outlier. In this specification and accompanying drawings, "aEb" represents $a \times 10^b$. Therefore, 8.0E-04 and 9.0E-4 represent $8.0 \times 10^{-4}$ and $9.0 \times 10^{-4}$, respectively. A cumulative probability chart after the cleansing processing to the source power current is shown in FIG. 19. By the removal of outliers, a graph approximate to a normal distribution can be confirmed. By this cleansing processing, the number of data remaining as objects of analysis is 550 records.

Next, taking the power source current as an objective variable, a degree of association and a threshold value are calculated with respect to each of the resistor parameters 1 to 11, the capacitance parameters 1 to 6, and transistor parameters 1 to 44, as follows: First, the power source current and one parameter are selected. A set of the power *source current and the parameter (hereinafter, "data pair") is rearranged in the ascending order of the value of the selected parameter. Data pairs are selected in the ascending order of the value of the selected parameter and a group of data pairs whose parameter value is below a certain value X is named group 1 and a group of data pairs whose parameter value is above X is named group 2. Calculation is made of a square sum of values of the power source current of group 1 and then of a square sum of values of the power source current of group 2. The value of X when a sum of thus obtained square sums becomes a smallest value is determined as the threshold and such sum of the square sums is determined as a degree of association.

Calculation is made of an average of power source current of each of the two groups divided by the threshold and if the group 1 whose X value is below the threshold has a smaller average of the power source current than the group 2 whose X value is above the threshold, then "=<threshold" is noted and in the opposite case, ">threshold" is noted so that the group having lower average is known. When the group is divided into two groups by the threshold, the number of data of group 1 is noted as Low-N and the number of data of the group 2 is noted as High-N. The above processing is performed as to all parameters. Then, all parameters are rearranged in the descending order of the sum of square sums (degree of association). 20 parameters having a large sum of square sums (degree of association) thus obtained is shown in FIG. 20 in the descending order.

Mutual independence degree is calculated as follows with respect to 20 parameters shown in FIG. 20. Description will be made of a calculation of the degree of independence, taking examples of a transistor parameter 11 and a transistor parameter 19. The data of the transistor parameter 11 and the transistor parameter 19 is shown in FIG. 21. The threshold of the transistor parameter 11 is set at 257 and the threshold of the transistor parameter 19 is set at 1.62 (see FIG. 20). When the data shown in FIG. 21 of each parameter is divided into two by the threshold, it is assumed that the number of data as to which the transistor parameter 11 is "=<275" and the transistor parameter 19 is ">1.62" is 340 and that the number of data as to which the transistor parameter 11 is ">275" and the transistor parameter 19 is "=<1.62" is 191.

The degree of independence is obtained by the three equations shown below. The number 550 in the first two equations represents the number of all data.

$$X_{Low} = 2 \times 340/(550+340-191) = 0.97281$$

$$X_{High} = 2 \times 191/(550+191-340) = 0.95261$$

$$\text{Degree of independence} = X_{LOW} + X_{High} - 1 = 0.92543$$

Same calculation is made as to other combinations than the combination of the transistor parameters 11 and 19 and independence between parameters as to 20 parameters shown in FIG. 20 is obtained. The results obtained of the degree of independence between parameters are shown in FIGS. 22 and 23. Data tables in FIGS. 22 and 23 should naturally be one data table, but the table is divided into two for easy of reading.

Parameters having a high degree of contribution to the power source current are selected as follows, based on the degree of association, the threshold, and the degree of independence, with respect to the 20 parameters shown in FIG. 20. If the number of data of the group 1 Low-N or the number of data of the group 2 High-N of a parameter when the data is divided into two groups by the threshold is equal to or less than 5% of the number of all data, namely equal to or less than 27.5 (=550×5%), then the parameter is excluded. The example shown in FIG. 20 has no pertinent parameter and therefore, no parameter is excluded here.

Next, a parameter having a largest sum of square sums is selected. In the example shown in FIG. 20, the transistor parameter 11 is pertinent. Referring to FIGS. 22 and 23, those parameters are excluded whose absolute value of the degree of independence in relation to the transistor parameter 11 is 0.6 or more. Pertinent parameters are transistor parameters 19, 17, 10, 8, 33, 20, 23, and 34 and these parameters are excluded. The transistor parameter 11 is also excluded.

A parameter having the largest sum of square sums is selected out of the remaining parameters. In the example shown in FIG. 20, a resistor parameter 9 is pertinent. Out of the remaining parameters, those parameters are excluded whose absolute value of the degree of independence in relation to the resistor parameter 9 is 0.6 or more, with reference to FIGS. 22 and 23. The resistor parameter 8 is pertinent and this parameter is excluded. The resistor parameter 9 is also excluded. By performing the same processing three more times, 5 parameters in total are selected; the transistor parameter 11, the resistor parameter 9, and transistor parameters 21, 13, and 22.

Figure 29:
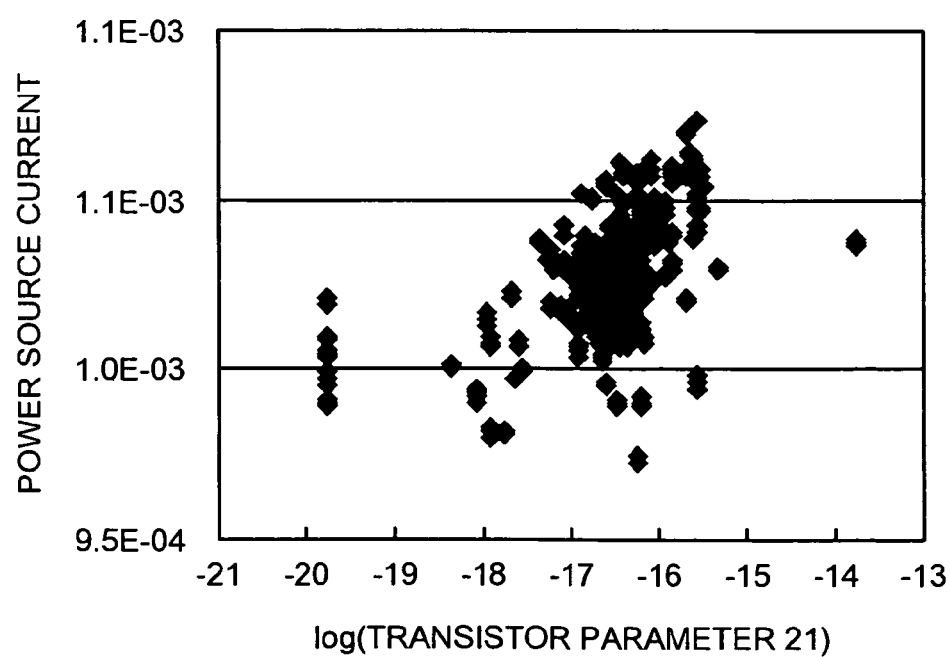
FIG. 29 is a scatter diagram of relationship between log (transistor parameter 21) and the power source current in a specific example.
Figure 30:
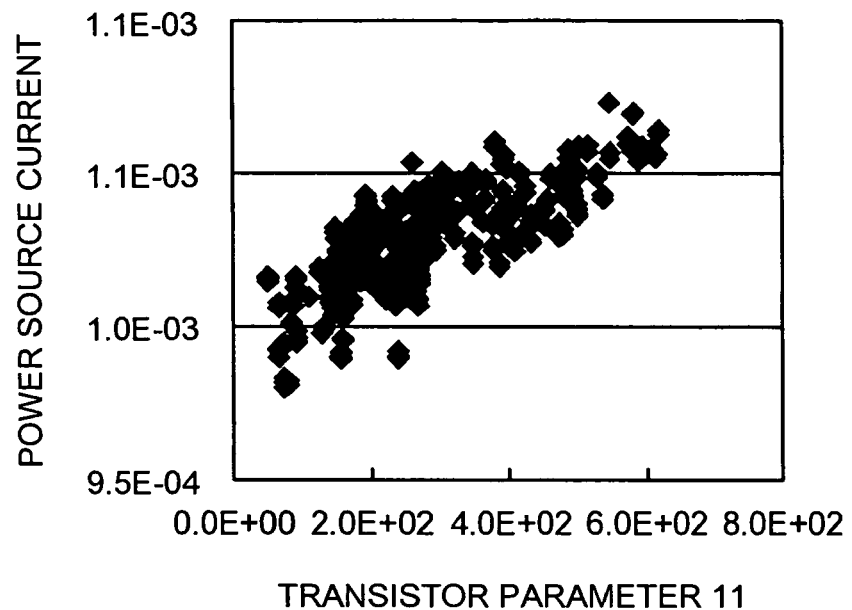
FIG. 30 is a scatter diagram of relationship between the transistor parameter 11 and the power source current after outliers are removed in a specific example.
Figure 31:
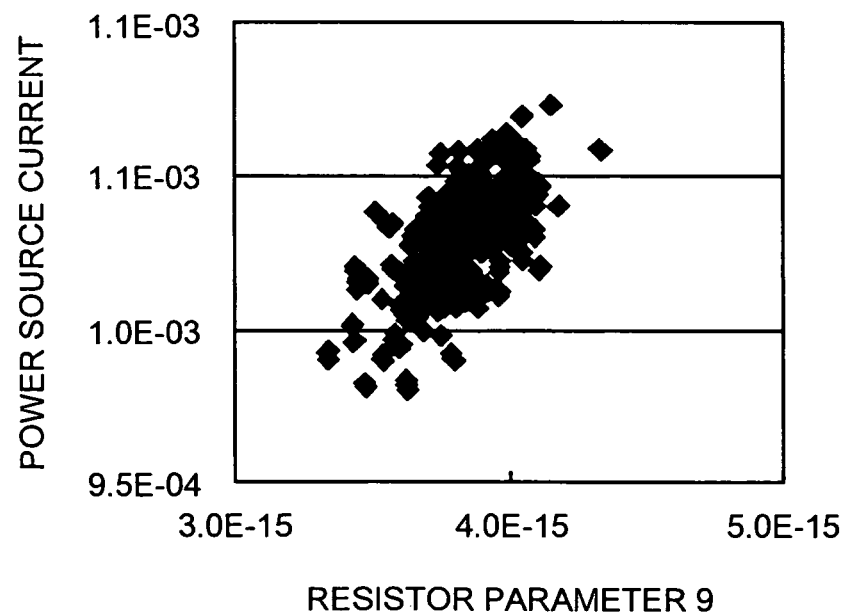
FIG. 31 is a scatter diagram of relationship between the resistor parameter 9 and the power source current after outliers are removed in a specific example.
Figure 32:
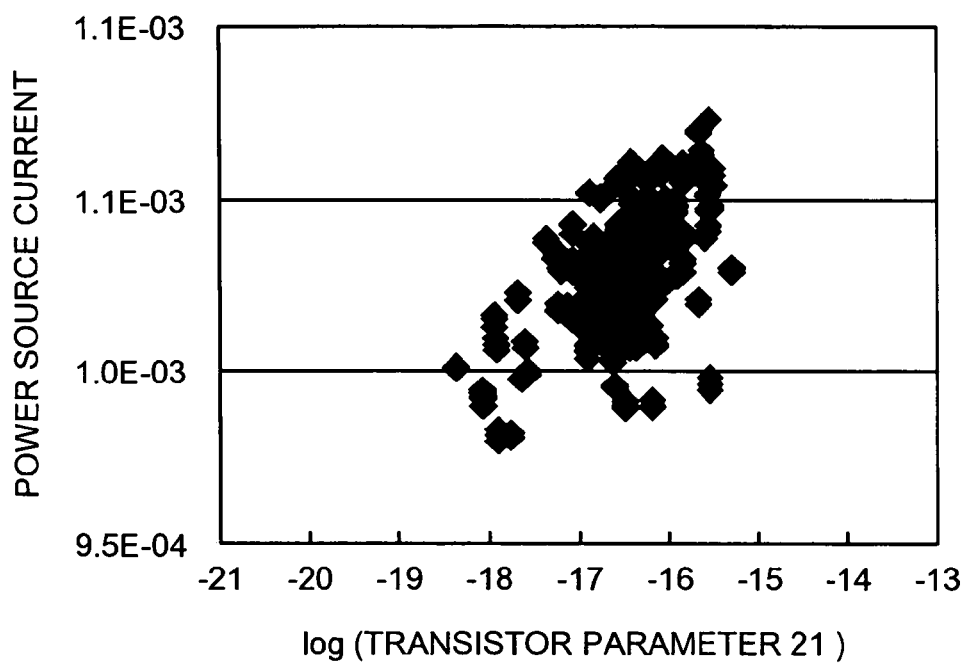
FIG. 32 is a scatter diagram of relationship between log (transistor parameter 21) and the power source current after removal of outliers in a specific example.
Figure 33:
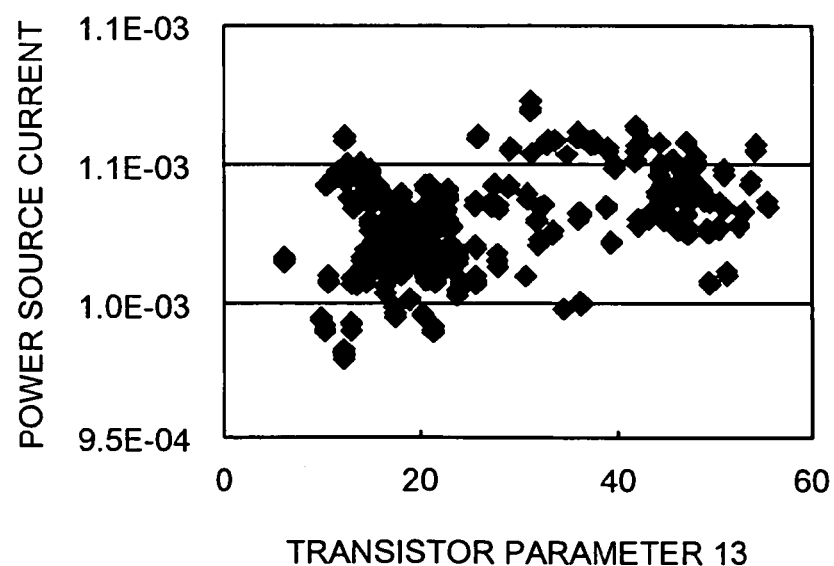
FIG. 33 is a scatter diagram of relationship between the transistor parameter 13 and the power source current after outliers are removed in a specific example.
Figure 34:
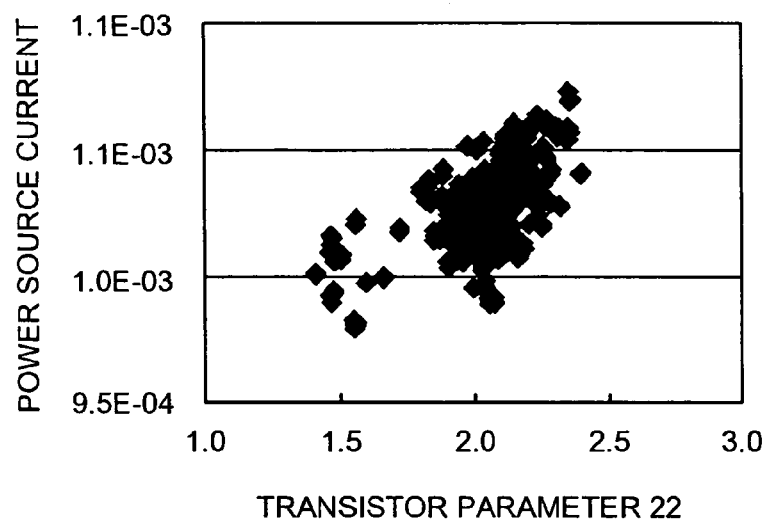
FIG. 34 is a scatter diagram of relationship between the transistor parameter 22 and the power source current after outliers are removed in a specific example.

Next, a variable conversion using function (function conversion) is performed as follows. Scatter diagrams of a relationship of the transistor parameter 11, the resistor parameter 9, the transistor parameter 21, a transistor parameter 13, and a transistor parameter 22 to the power source current are shown in FIG. 24, FIG. 25, FIG. 26, FIG. 27, and FIG. 28, respectively. The relationship between the transistor parameter 21 and the power source current is not a linear relationship but a curve relationship. Then the transistor parameter 21 undergoes the variable conversion using a function and is converted to a log (transistor parameter 21). A scatter diagram of the relationship between the log (transistor parameter 21) and the power source current is shown in FIG. 29. It is shown that the relationship between the log (transistor parameter 21) and the power source current is closer to a linear relationship.

Next, cleansing is applied to the transistor parameter 11, the resistor parameter 9, the log (transistor parameter 21), the transistor parameter 13, and the transistor parameter 22. Records including the outliers widely away from a group in the scatter diagrams shown in FIGS. 24 to 29 (excluding FIG. 26) are removed. FIGS. 30 to 34 show the scatter diagrams of the transistor parameter 11, the resistor parameter 9, the log (transistor parameter 21), the transistor parameter 13, and the transistor parameter 22, respectively, after removal of all outliers.

A multiple regression equation is estimated as follows. The regression analysis is applied to the transistor parameter 11, the resistor parameter 9, the log (transistor parameter 21), the transistor parameter 13, and the transistor parameter 22, and a variable increase method is applied as a method of selecting variables. As a result, variables of the transistor parameter 11, the resistor parameter 9, the log (transistor parameter 21), the transistor parameter 13, and the transistor parameter 22 are selected in this order. The cumulative contribution rates of these variables when selected are shown in FIG. 35.

Figure 35:
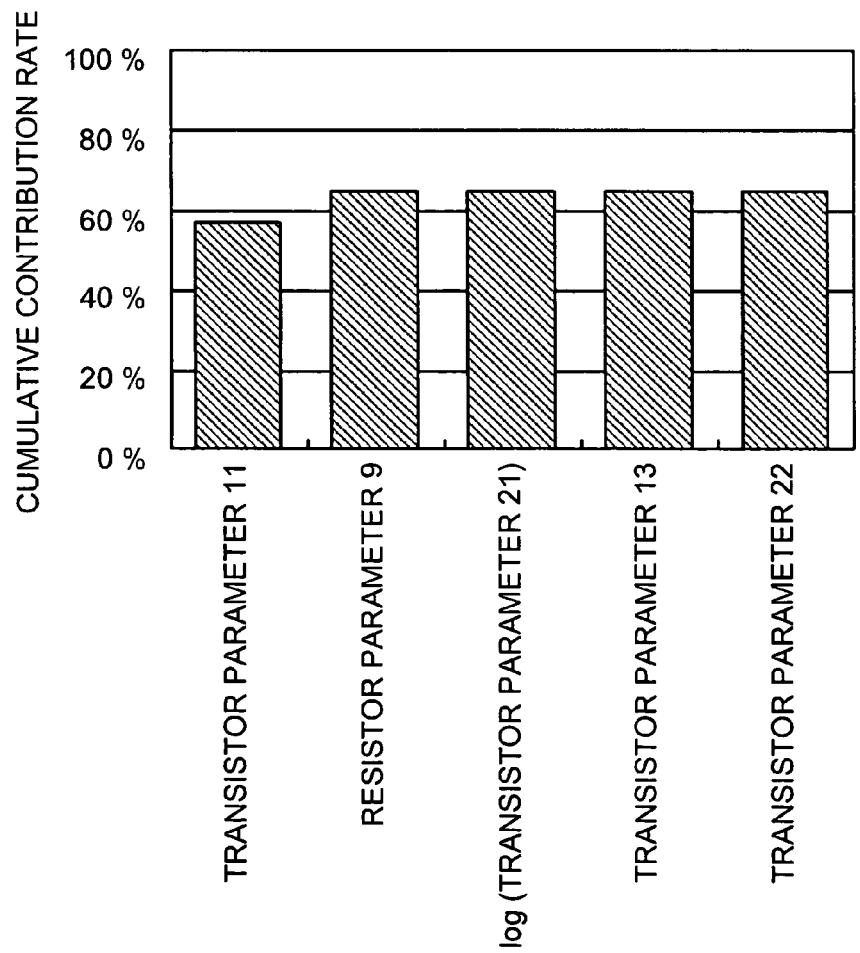
FIG. 35 is a graph of cumulative contribution rate when 5 parameters are selected in a specific example.
Figure 39:
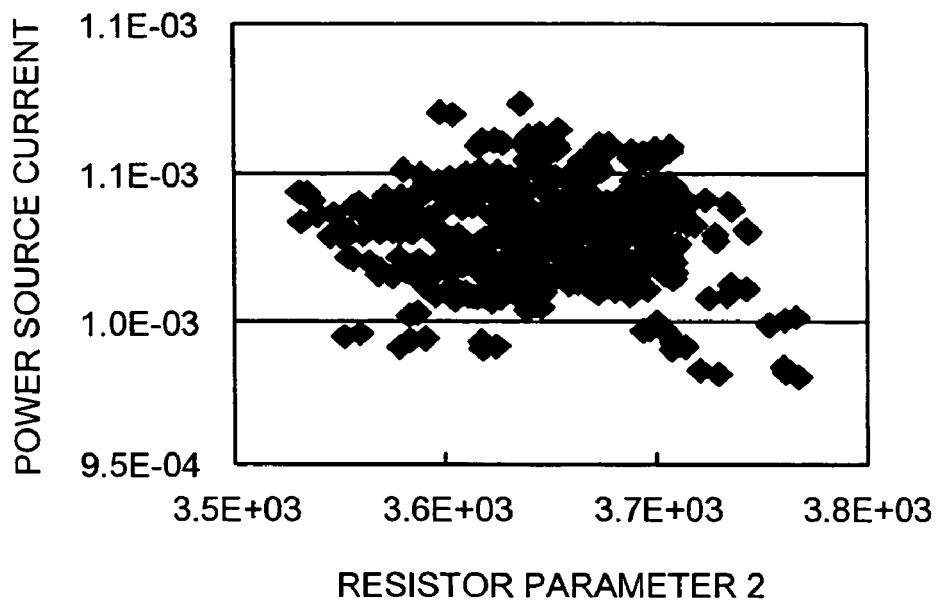
FIG. 39 is a scatter diagram of relationship of the resistor parameter 2 and the power source current in a specific example.
Figure 40:
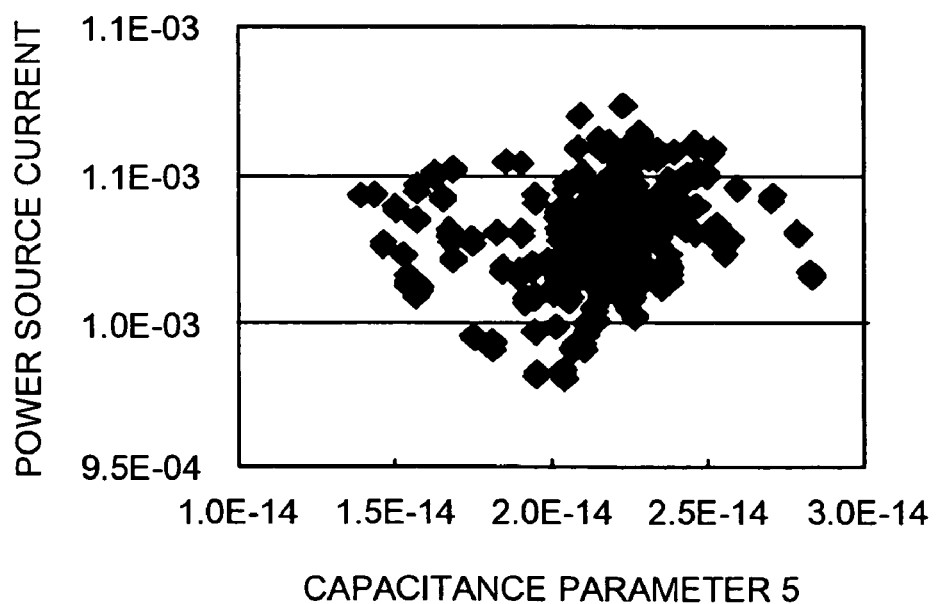
FIG. 40 is a scatter diagram of relationship between a capacitance parameter 5 and the power source current in a specific example.
Figure 41:
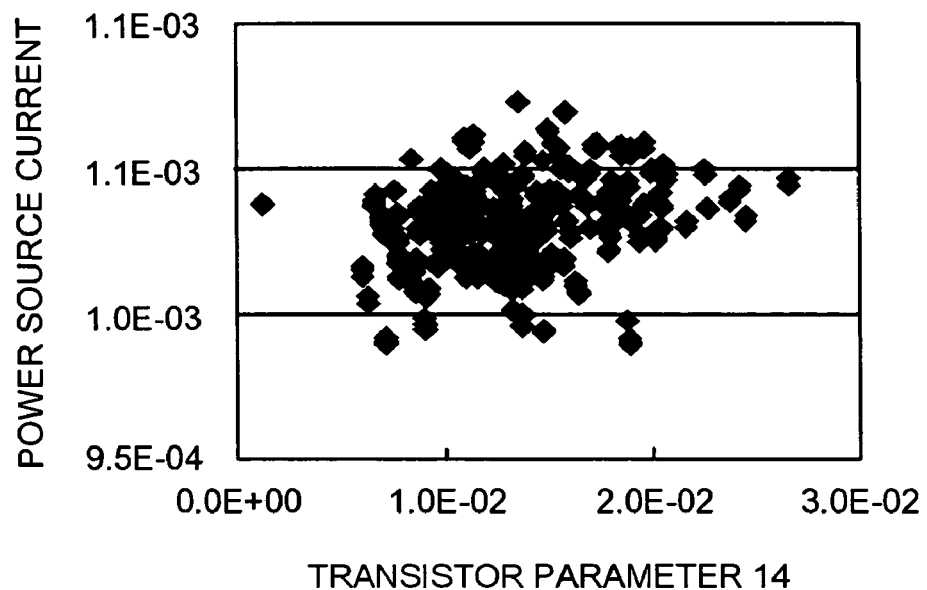
FIG. 41 is a scatter diagram of relationship between a transistor parameter 14 and the power source current in a specific example.
Figure 42:
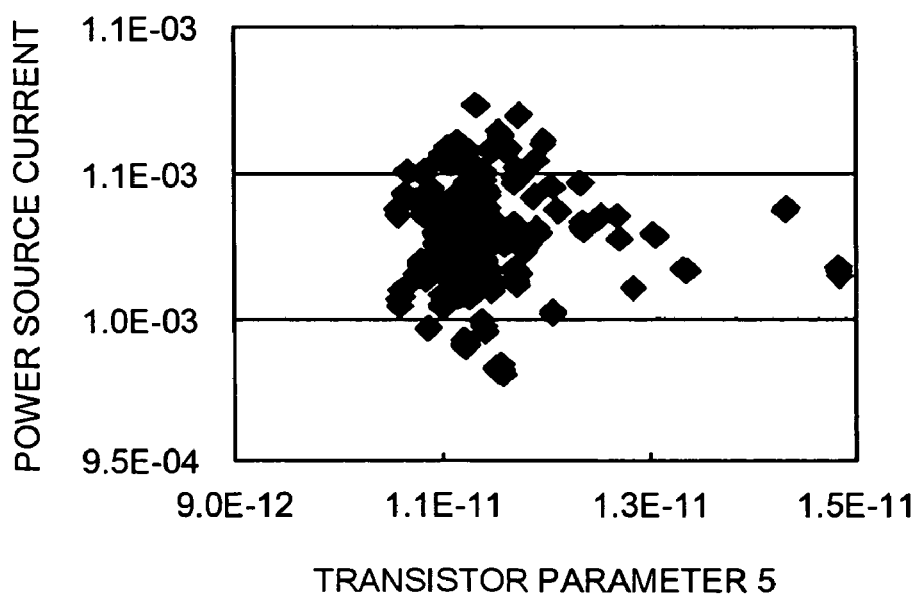
FIG. 42 is a scatter diagram of relationship between a transistor parameter 5 and the power source current in a specific example.
Figure 43:
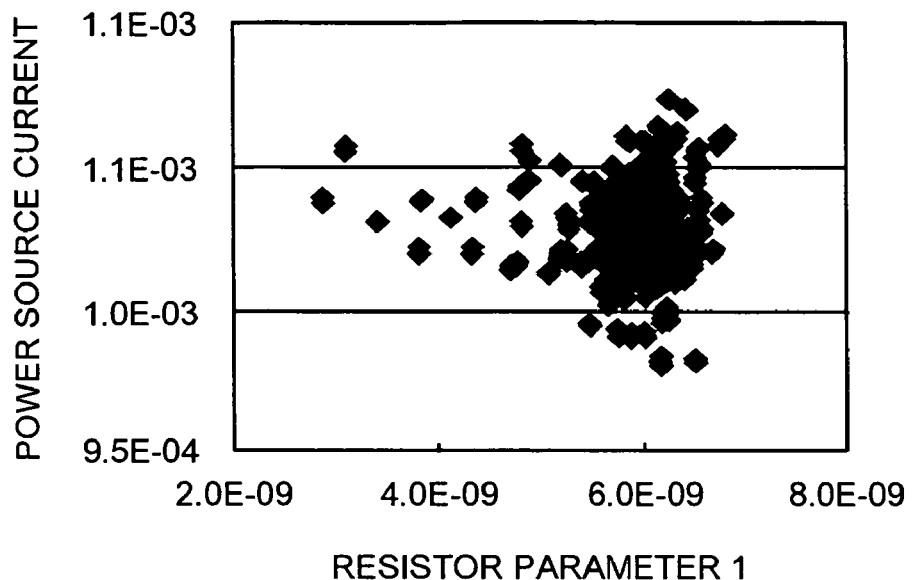
FIG. 43 is a scatter diagram of relationship of the resistor parameter 1 and the power source current in a specific example.
Figure 44:
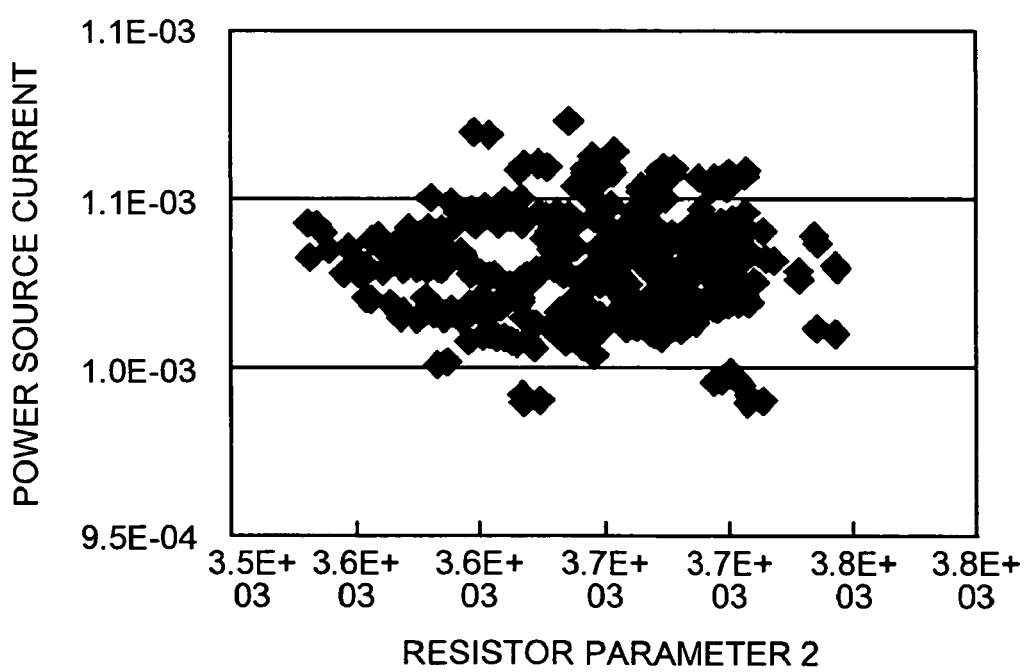
FIG. 44 is a scatter diagram of relationship between the resistor parameter 2 and the power source current after outliers are removed in a specific example.
Figure 45:
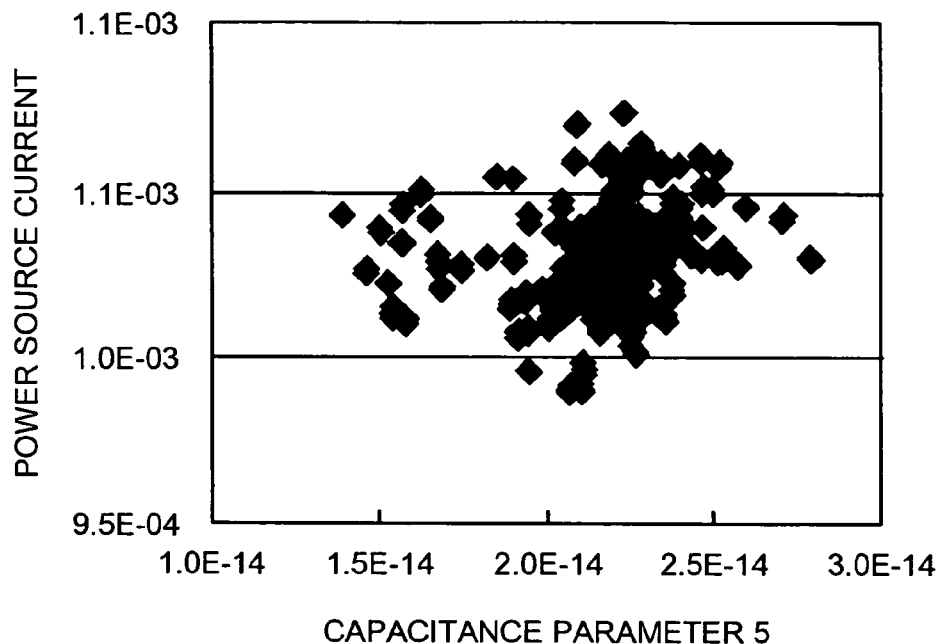
FIG. 45 is a scatter diagram of relationship between the capacitance parameter 5 and the power source current after outliers are removed in a specific example.
Figure 46:
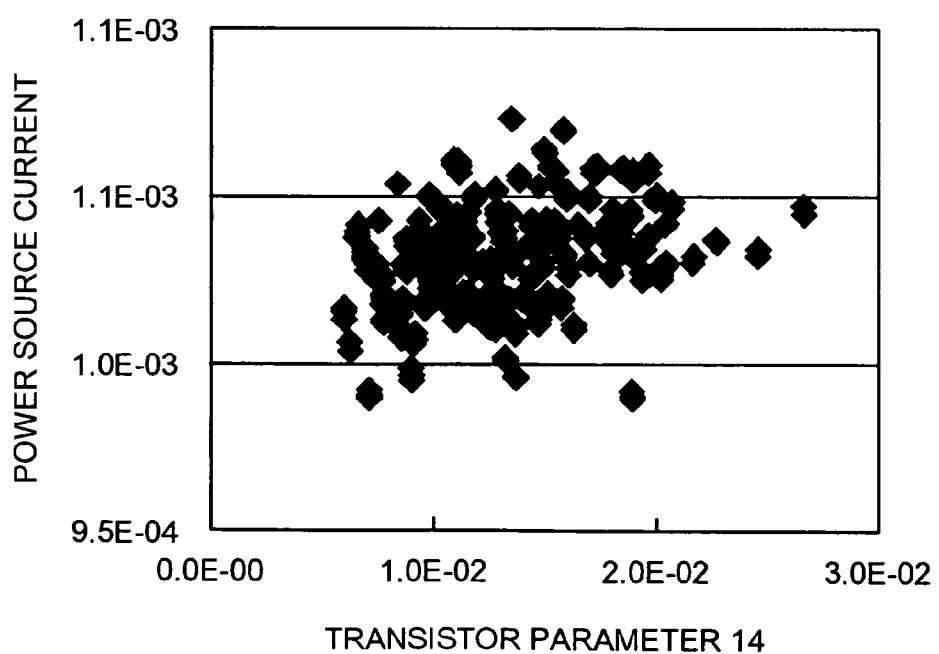
FIG. 46 is a scatter diagram of relationship between the transistor parameter 14 and the power source current after outliers are removed in a specific example.
Figure 47:
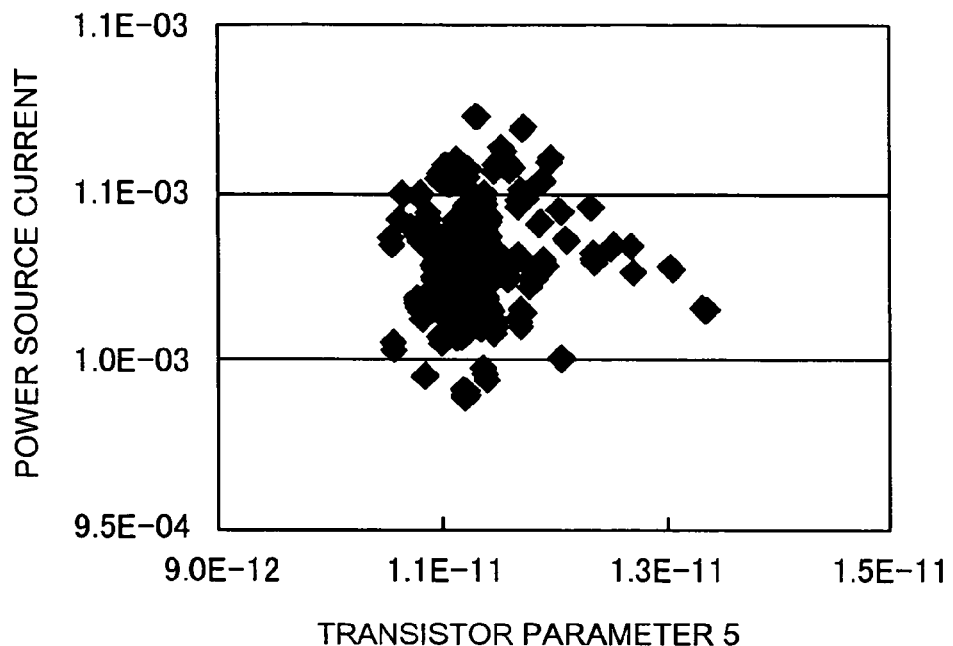
FIG. 47 is a scatter diagram of relationship between the transistor parameter 5 and the power source current after outliers are removed in a specific example.
Figure 48:
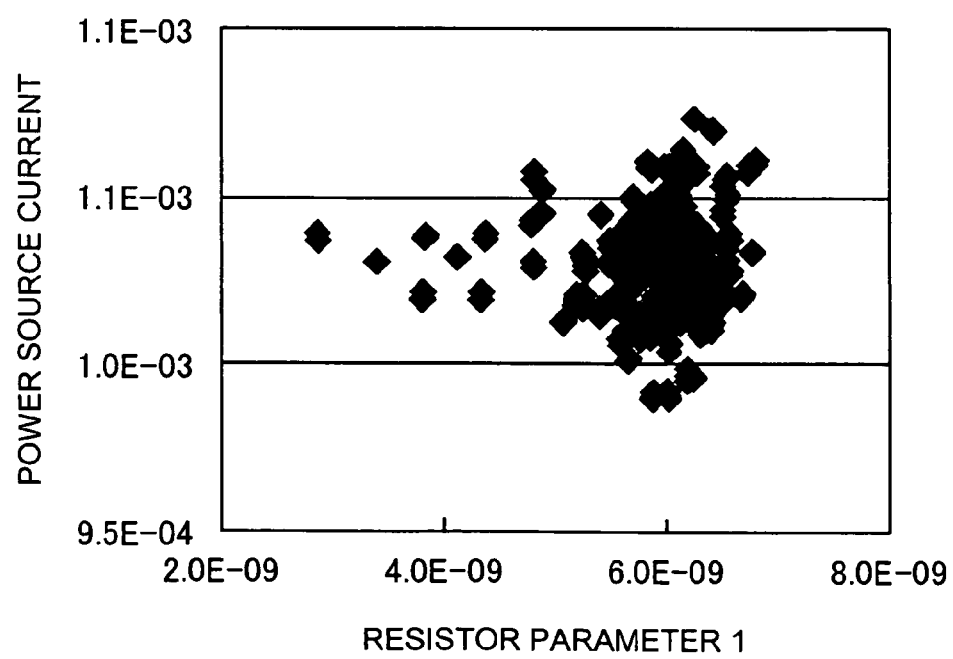
FIG. 48 is a scatter diagram of relationship between the resistor parameter 1 and the power source current after outliers are removed in a specific example.

As shown in FIG. 35, two variables of the transistor parameter 11 and the resistor parameter 9 bring the cumulative contribution rate to 64%. Even if the log (transistor parameter 21) is added to this, the change of the cumulative contribution rate is 0.5%, which is less than 1%. Therefore, the transistor parameter 11 and the resistor parameter 9 are selected as the variables making a high contribution to the power source current. A regression equation is calculated between these two variables and the power source current, as follows.

Power source current=$8.80E-4 + 7.53E-08 \times$ transistor parameter $11 + 3.32E+10 \times$ resistor parameter 9 Using this regression equation, an estimated value of the power source current is obtained, and a residual $\Delta$ from a measured value of the power source current is obtained, for each record of the data. Using the residuals as a new objective variable, the degree of association and the threshold are again calculated with respect to each of remaining resistor parameters, capacitance parameters, and transistor parameters after excluding the transistor parameter 11 and the resistor parameter 9. 20 parameters having a large sum of square sums (degree of association) obtained as a result are shown in FIG. 36. FIGS. 37 and 38 show the results of calculation of the degree of independence between parameters as to 20 parameters shown in FIG. 36. FIG. 37 and FIG. 38 should naturally be one data table, but the table is divided into two for easy of reading.

Next, out of 20 parameters shown in FIG. 36, five parameters highly contributing to the power source current are selected again, based on the degree of association, the threshold, and the degree of independence. Selected are a resistor parameter 2, a capacitance parameter 5, a transistor parameter 14, a transistor parameter 5, and a resistor parameter 1. FIG. 39 to 43 are scatter diagrams of the relationship of the resistor parameter 2, the capacitance parameter 5, the transistor parameter 14, the transistor parameter 5, and the resistor parameter 1, respectively, to the power source current. As shown in FIGS. 39 to 43, since no strong relationship other than a liner relationship is detected with respect to any parameter, the variable conversion using functions are not performed here.

Again, the cleansing is applied to the resistor parameter 2, the capacitance parameter 5, the transistor parameter 14, the transistor parameter 5, and the resistor parameter 1. Records including the outliers widely away from a group in the scatter diagrams shown in FIGS. 39 to 43 are removed. FIGS. 44 to 48 are the scatter diagrams of the resistor parameter 2, the capacitance parameter 5, the transistor parameter 14, the transistor parameter 5, and the resistor parameter 1, respectively, after removal of all outliers.

Again, a multiple regression equation is estimated as follows. A regression analysis is applied to the power source current, and the transistor parameter 11 and the resistor parameter 9 selected at the first round, and the resistor parameter 2, the capacitance parameter 5, the transistor parameter 14, the transistor parameter 5, and the resistor parameter 1 selected at this second round, and the variable increase method is applied as a method of selecting variables. As a result, the transistor parameter 11, the resistor parameter 2, the resistor parameter 9, the capacitance parameter 5, the resistor parameter 1, the transistor parameter 5, and the transistor parameter 14 are selected in this order. The cumulative contribution rate of these variables when selected is shown in FIG. 49.

Figure 49:
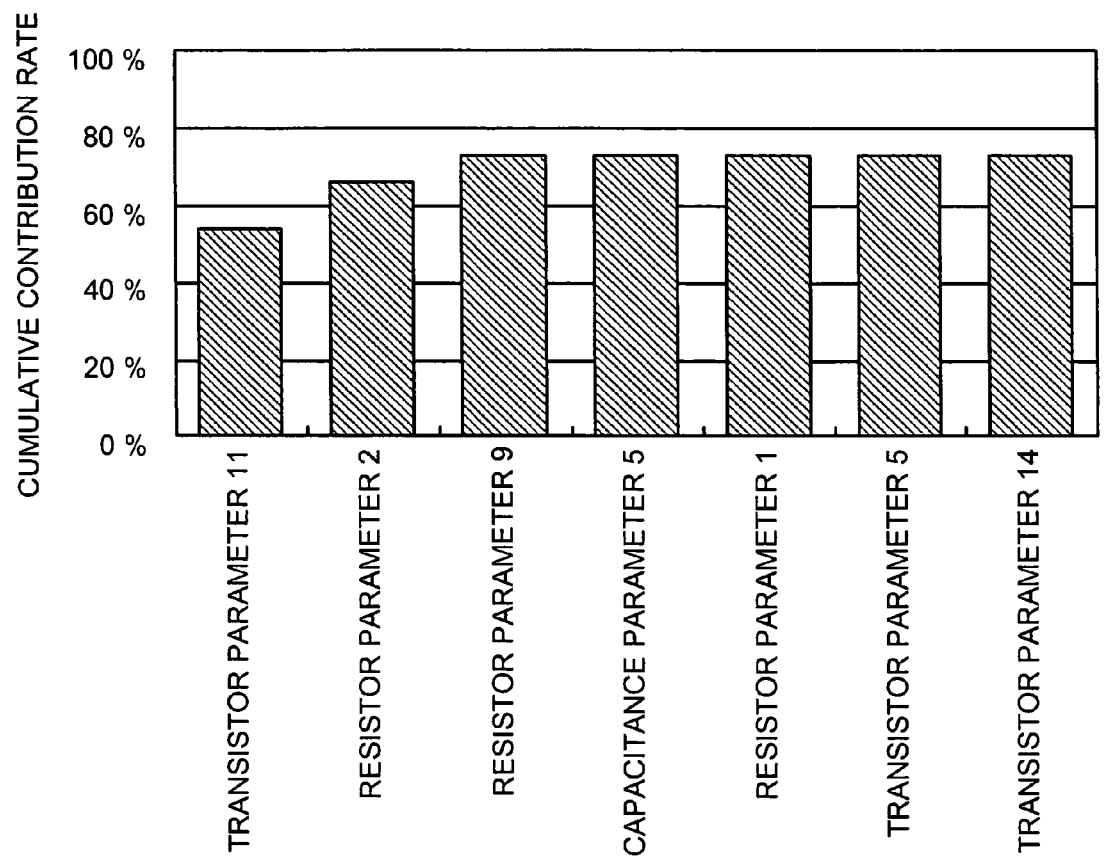
FIG. 49 is a graph of cumulative contribution rate when 7 parameters are selected in a specific example.

As shown in FIG. 49, three variables of the transistor parameter 11, the resistor parameter 2, and the resistor parameter 9 bring the cumulative contribution rate to 73%. Even if the capacitance parameter 5 is added to this, a change of the cumulative contribution rate is 0.3%, which is less than 1%.

Therefore, three variables of the transistor parameter 11, the resistor parameter 2, and the resistor parameter 9 are selected as variables highly contributing to the power source current. Alternatively, the regression equation may be calculated until the cumulative contribution rate becomes larger than a certain value or until there is little change in an increase rate or a change rate of the cumulative contribution rate, and again same processing may be applied to the residual Δ of the power source current.

After selection of the variables highly contributing to the power source current, parameters having a large effect are selected with respect to other circuit characteristic data as well, namely, the gain and the noise factor, in the same manner as in the case of the power source current. It is assumed that as a result of such selection, a transistor parameter 8, the transistor parameter 13, a capacitance parameter 6, and the resistor parameter 2 are selected as variables highly contributing to the gain and that the transistor parameter 11, the resistor parameter 2, the transistor parameter 13, and a capacitance parameter 4 are selected as variables highly contributing to the noise factor.

In this case, as a result of processing with respect to the power source current, the gain, and the noise factor, the transistor parameter 11, the transistor parameter 8, and the transistor parameter 13 are obtained in the transistor model. The resistor parameter 2 and the resistor parameter 9 are obtained in the resistor model. The capacitance parameter 4 and the capacitance parameter 6 are obtained in the capacitance model.

Next, when these seven parameters are applied to a normal distribution, an average of the resistor parameter 2, the resistor parameter 9, the capacitance parameter 4, the capacitance parameter 6, the transistor parameter 11, the transistor parameter 8, and the transistor parameter 13 is 3.65E+03, 3.82E−15, 1.35E−12, 3.25E−15, 1.26E+03, 2.76E+02, and 1.86E+01, respectively. A variance of these parameters is 4.60E+01, 1.57E−16, 3.41E−14, 3.40E−16, 2.47E+02, 1.30E+02, and 3.53E+00, respectively. With respect to parameters other than the parameters within each model described here, models representing such parameters can be obtained by applying the regression analysis to respective parameters within the model.

As described above, the embodiment enables analysis without an effect of an explanatory variable having a great effect on an objective variable, by repeatedly performing analysis using a difference between an estimated value and a measured value of the objective variable as a new objective variable. Therefore, it is possible to check the effect of the explanatory variable giving fluctuations small enough to be hidden behind the fluctuations of the explanatory variable having a great effect on the objective variable. Generally, when a regression analysis is performed of the explanatory variable and objective variables and these variables have outliers, correct results of the regression analysis can be obtained by removing these outliers in advance. Because an explanatory variable data is divided into two groups by a certain threshold, and with respect to two divided data groups, a degree of association is obtained by calculating a value t between data groups of the explanatory variable, and a degree of independence is calculated based on the number of data divided by the threshold between explanatory variables, and since values of explanatory variable themselves are not used, there is no need for closely examining and removing outliners of explanatory variable in advance, explanatory variables having an effect on the objective variable can efficiently be selected.

The data processing method described in the embodiment of the present invention can be realized by executing a pre-arranged program on computers such as a personal computer and a workstation. This program is recorded on a computer-readable recording medium, such as an HD, an FD, a CD-ROM, an MO, and a DVD, and is executed by being read out from a recording medium by the computer. This program may be in the form of transmission medium that can be distributed through a network such as the Internet.

While description has been made of objective variables and explanatory variables having characteristics of continuous values in the above embodiment, the present invention is not to be limited thereto or thereby.

According to the embodiments described above, it is possible to select an explanatory variable having a high degree of effect on an objective variable out of a plurality of explanatory variables of continuous volume associated with the objective variable of continuous volume. Moreover, it is possible to extract accurately and speedily a SPICE parameter having an effect on variations of circuit characteristic data out of many SPICE parameters and expression of a model expressive of variations of SPICE parameter explaining variations of circuit characteristic data-with a small number of SPICE parameters.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer implemented data processing method of determining a plurality of explanatory variables that have great effect on an objective variable in target data, comprising:

calculating a degree of association between the objective variable and each of a plurality of explanatory variables;

extracting a plurality of explanatory variables based on the degree of association;

calculating a degree of independence between the explanatory variables extracted based on the degree of association;

selecting, from the explanatory variables, a plurality of candidates of explanatory variables that have high possibility of having a great effect on the objective variable based on the degree of association and the degree of independence;

selecting an explanatory variable having a high rate of contribution to the objective variable from among the candidates;

calculating a regression equation to estimate a value of the objective variable using the selected explanatory variable having a high rate of contribution; and calculating difference between the estimated value and a known measured value of the objective variable;

acquiring a threshold used to group processing target data into a first group and a second group, the first group comprising at least one record having an explanatory variable is equal to or lower than the threshold, the second group comprising at least one record having an explanatory variable is higher than the threshold and forming the two groups; and calculating a cumulative contribution rate by summing contribution rates of the explanatory variables in a descending order of the contribution rate, using the difference as a new objective variable, and using explanatory variables except the selected explanatory variable having a high rate of contribution as new explanatory variables, a series of processing including the calculating a degree of association, the extracting, the calculating a degree of independence, the selecting candidates, the selecting an explanatory variable, the calculating a regression equation, and the calculating difference is repeated until the cumulative contribution rate reaches a predetermined value, and wherein the calculating the degree of association is based on number of records comprising the first group and number of records comprising the second group, values of the objective variable in the two groups, and averages and sum squares of the objective variable values in the two groups.

2. The data processing method of claim 1, wherein the calculating a degree of association includes calculating as the degree of association a degree of unification between the first group and the second group.

3. The data processing method of claim 1, wherein the calculating a degree of association includes calculating as the degree of association a value $t_1$ determined by:

$$|Avg(G1)-Avg(G2)|$$

$$t_1=\sqrt{((S1+S2)/(N1+N2-2)\times(1/N1+1/N2))}$$

where G1 and G2 represent a set of the objective variable values of the first group and of the second group respectively, Avg(G1) and Avg(G2) represent an average of the objective variable values of the first group and of the second group respectively, N1 and N2 represent the number of records of the first group and of the second group respectively, and S1 and S2 represent a square sum of the objective variable values of the first group and of the second group respectively, wherein the grouping is formed using the one of the plurality of explanatory variables, wherein the threshold is determined so that the value $t_1$ becomes greatest between a minimum value and a maximum value of the objective variable.

4. The data processing method according to claim 1, wherein the calculating a degree of association includes calculating as the degree of association a value of a correlation coefficient between the objective variable and each one of the identified explanatory variables.

5. The data processing method according to claim 1, wherein the calculating a degree of association includes calculating as the degree of association an order of correlation coefficient between the objective variable and each one of the identified explanatory variables.

6. The data processing method according to claim 1, further comprising:

extracting a first and a second arbitrary explanatory variables;

grouping data into a third group and a fourth group based on a second threshold, wherein the third group is comprising at least one record having the first arbitrary explanatory variable with a value that is equal to or lower than the second threshold, and the fourth group is comprising at least one record having the first arbitrary explanatory variable with the value that is higher than the second threshold; and calculating as the degree of independence a ratio of correspondence or non-correspondence between second arbitrary explanatory variable values belonging to the third group and the second the arbitrary explanatory variable values belonging to the fourth group.

7. The data processing method according to claim 1, further comprising:

extracting a first and a second arbitrary explanatory variables;

grouping data into a third group and a fourth group based on a second threshold, wherein the third group is comprising at least one record having the first arbitrary explanatory variable with a value that is equal to or lower than the second threshold, and the fourth group is comprising at least one record having the first arbitrary explanatory variable with the value that is higher than the second threshold; and calculating as the degree of independence a value $t_2$ determined by:

$$|Avg(G3)-Avg(G4)|$$

$$t_2=\sqrt{((S3+S4)/(N3+N4-2)\times(1/N3+1/N4))}$$

where G3 and G4 represent a set of values of the second arbitrary explanatory variable belonging to the third group and a set of values of the second arbitrary explanatory variable belong to the fourth group respectively, Avg (G3) and Avg (G4) represent an average of the values of the second arbitrary explanatory variable belonging to the third group and the values of the second arbitrary explanatory variable belonging to the fourth group respectively, N3 and N4 represent number of records of the third group and of the fourth group respectively, and S3 and S4 represent a square sum of the values of the second arbitrary explanatory variable belonging to the third group and a square sum of the values of the second arbitrary explanatory variable belonging to the fourth group respectively;

wherein the second threshold is determined so that the value $t_2$ becomes greatest between a minimum value and a maximum value of the second arbitrary explanatory variable.

8. The data processing method according to claim 1, wherein the extracting includes extracting two arbitrary explanatory variables, and the calculating a degree of independence includes calculating as the degree of independence a value of a correlation coefficient between the two arbitrary explanatory variables.

9. The data processing method according to claim 1, wherein the extracting includes extracting two arbitrary explanatory variables, and the calculating a degree of independence includes calculating as the degree of independence an order of correlation coefficient between the two arbitrary explanatory variables.

10. The data processing method according to claim 1, wherein the extracting includes extracting the subset of the plurality of explanatory variables in a descending order of their degree of association with the objective variable.

11. The data processing method of claim 1, further comprising:

finding a combination of the selected explanatory variables whose multiple correlation coefficient is largest among the plurality of the selected explanatory variables, by applying a round-robin method of multiple regression analysis;

wherein the selecting an explanatory variable includes selecting an explanatory variable based on a relationship between the number of explanatory variables and their cumulative contribution rate, and the calculating a regression equation includes forming a multiple regression equation using the explanatory variables selected.

12. The data processing method according to claim 11, wherein the multiple regression equation is formed after a function conversion of the objective variable and at least one of the explanatory variables selected.

13. The data processing method according to claim 1, further comprising removing an abnormal value of the objective variable.

14. A computer-readable recording medium that stores therein computer executable instructions which when executed on a computer realize a data processing method of determining a plurality of explanatory variables that have great effect on an objective variable in target data, the medium comprising instructions for:

calculating a degree of association between the objective variable and each of a plurality of explanatory variables;

extracting a plurality of explanatory variables based on the degree of association;

calculating a degree of independence between the explanatory variables extracted based on the degree of association;

selecting, from the explanatory variables, a plurality of candidates of explanatory variables that have high possibility of having a great effect on the objective variable based on the degree of association and the degree of independence;

selecting an explanatory variable having a high rate of contribution to the objective variable from among the candidates;

calculating a regression equation to estimate a value of the objective variable using the selected explanatory variable having a high rate of contribution; and calculating difference between the estimated value and a known measured value of the objective variable;

acquiring a threshold used to group processing target data into a first group and a second group, the first group comprising at least one record having an explanatory variable is equal to or lower than the threshold, the second group comprising at least one record having an explanatory variable is higher than the threshold and forming the two groups; and calculating a cumulative contribution rate by summing contribution rates of the explanatory variables in a descending order of the contribution rate, using the difference as a new objective variable, and using explanatory variables except the selected explanatory variable having a high rate of contribution as new explanatory variables, a series of processing including the calculating a degree of association, the extracting, the calculating a degree of independence, the selecting candidates, the selecting an explanatory variable, the calculating a regression equation, and the calculating difference is repeated until the cumulative contribution rate reaches a predetermined value, and wherein the calculating the degree of association is based on number of records comprising the first group and number of records comprising the second group, values of the objective variable in the two groups, and averages and sum squares of the objective variable values in the two groups.

\* \* \* \* \*